United States Patent
Narumi et al.

(10) Patent No.: US 7,450,480 B2
(45) Date of Patent: Nov. 11, 2008

(54) OPTICAL INFORMATION RECORDING METHOD, OPTICAL INFORMATION RECORDING DEVICE AND OPTICAL INFORMATION RECORDING MEDIUM

(75) Inventors: Kenji Narumi, Suita (JP); Naoyasu Miyagawa, Kawanishi (JP)

(73) Assignee: Panasonic Corporation, Osaka (JP)

(*) Notice: Subject to any disclaimer, the term of this patent is extended or adjusted under 35 U.S.C. 154(b) by 854 days.

(21) Appl. No.: 10/852,113

(22) Filed: May 25, 2004

(65) Prior Publication Data

US 2004/0240105 A1 Dec. 2, 2004

(30) Foreign Application Priority Data

May 27, 2003 (JP) ............... 2003-149731

(51) Int. Cl.
*G11B 7/00* (2006.01)
(52) U.S. Cl. .................. 369/47.5; 369/59.11; 369/116
(58) Field of Classification Search ............. 369/59.11, 369/59.12, 59.1, 116, 47.5, 47.51, 47.52, 369/47.53, 47.55
See application file for complete search history.

(56) References Cited

U.S. PATENT DOCUMENTS

| | | | |
|---|---|---|---|
| 6,411,579 B2 * | 6/2002 | Nobukuni et al. ........ | 369/59.12 |
| 6,459,666 B1 | 10/2002 | Yokoi | |
| 6,459,670 B1 | 10/2002 | Kuwahara et al. | |
| 6,661,759 B1 | 12/2003 | Seo | |
| 6,765,854 B2 * | 7/2004 | Tieke et al. ................ | 369/59.1 |
| 6,771,577 B2 * | 8/2004 | Yokoi ..................... | 369/59.11 |
| 7,139,230 B2 * | 11/2006 | Shirota et al. ........... | 369/59.11 |
| 7,301,883 B1 * | 11/2007 | Balasubramanian et al. | 369/116 |
| 2002/0001275 A1 | 1/2002 | Tanaka et al. | |

FOREIGN PATENT DOCUMENTS

| | | |
|---|---|---|
| EP | 0 902 424 | 3/1999 |
| JP | 4-205919 | 7/1992 |
| JP | 7-129959 | 5/1995 |
| JP | 8-287465 | 11/1996 |
| JP | 10-241164 | 9/1998 |
| JP | 11-102522 | 4/1999 |
| JP | 2001-23175 | 1/2001 |
| JP | 2001-110054 | 4/2001 |
| JP | 2001-307325 | 11/2001 |
| JP | 2001-331936 | 11/2001 |
| JP | 2003-505808 | 2/2003 |
| JP | 2003-85753 | 3/2003 |
| WO | 01/06500 | 1/2001 |

* cited by examiner

*Primary Examiner*—Nabil Z Hindi
(74) *Attorney, Agent, or Firm*—Wenderoth, Lind & Ponack, L.L.P.

(57) ABSTRACT

A recording and reproducing method is provided in which information can be recorded and reproduced correctly using a simple circuit structure, even with a high transfer rate, and a test record can be performed efficiently in a short time. A laser driving circuit 6 makes power levels of a front end pulse and a rear end pulse different from a power level of a middle pulse, and a record signal edge correction circuit 5 corrects an edge position of a recording pulse.

7 Claims, 14 Drawing Sheets

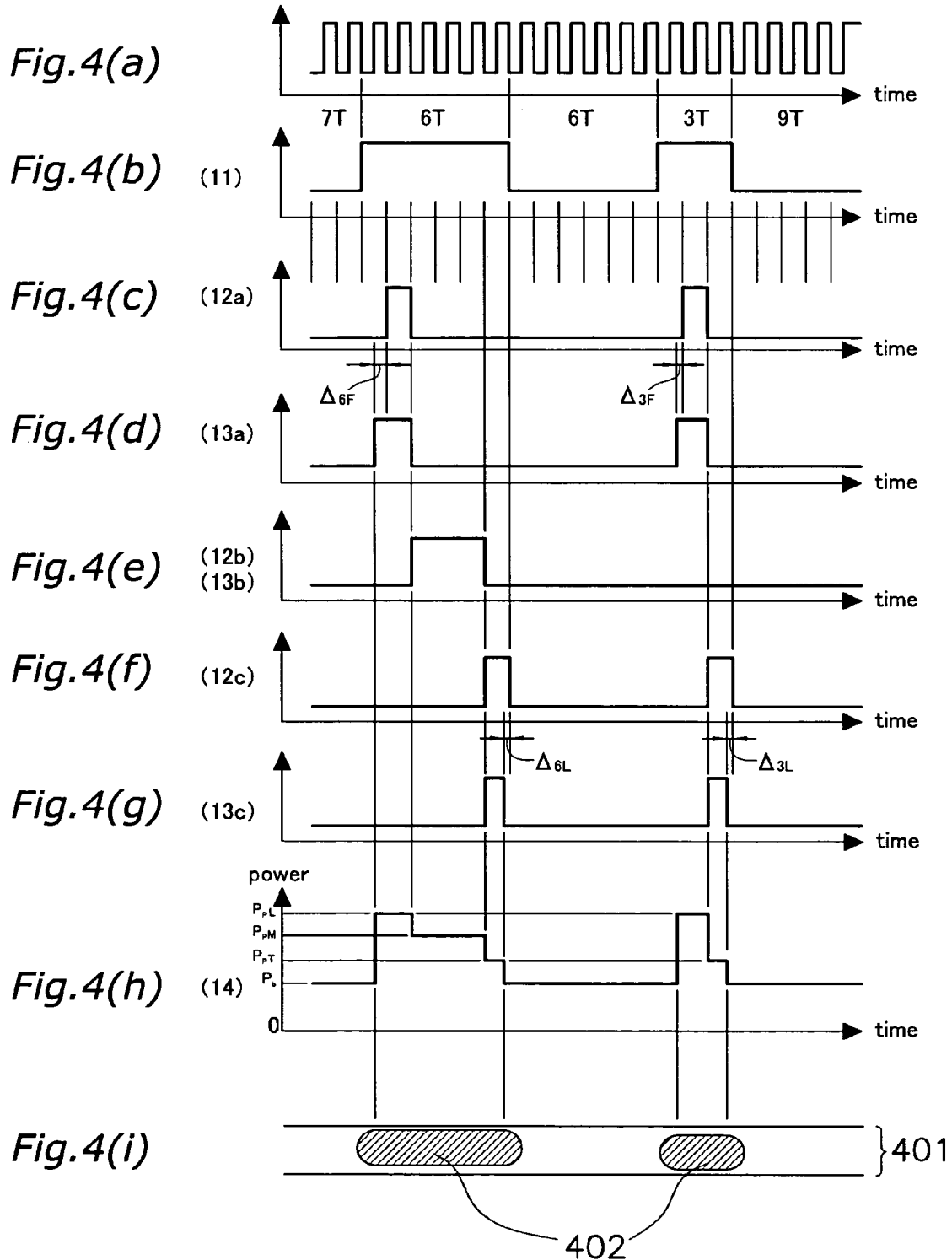

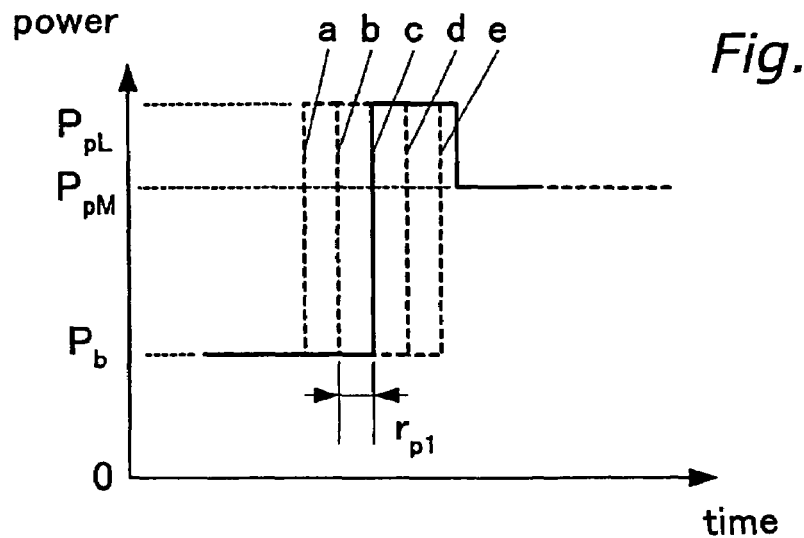
*Fig. 5(a)*
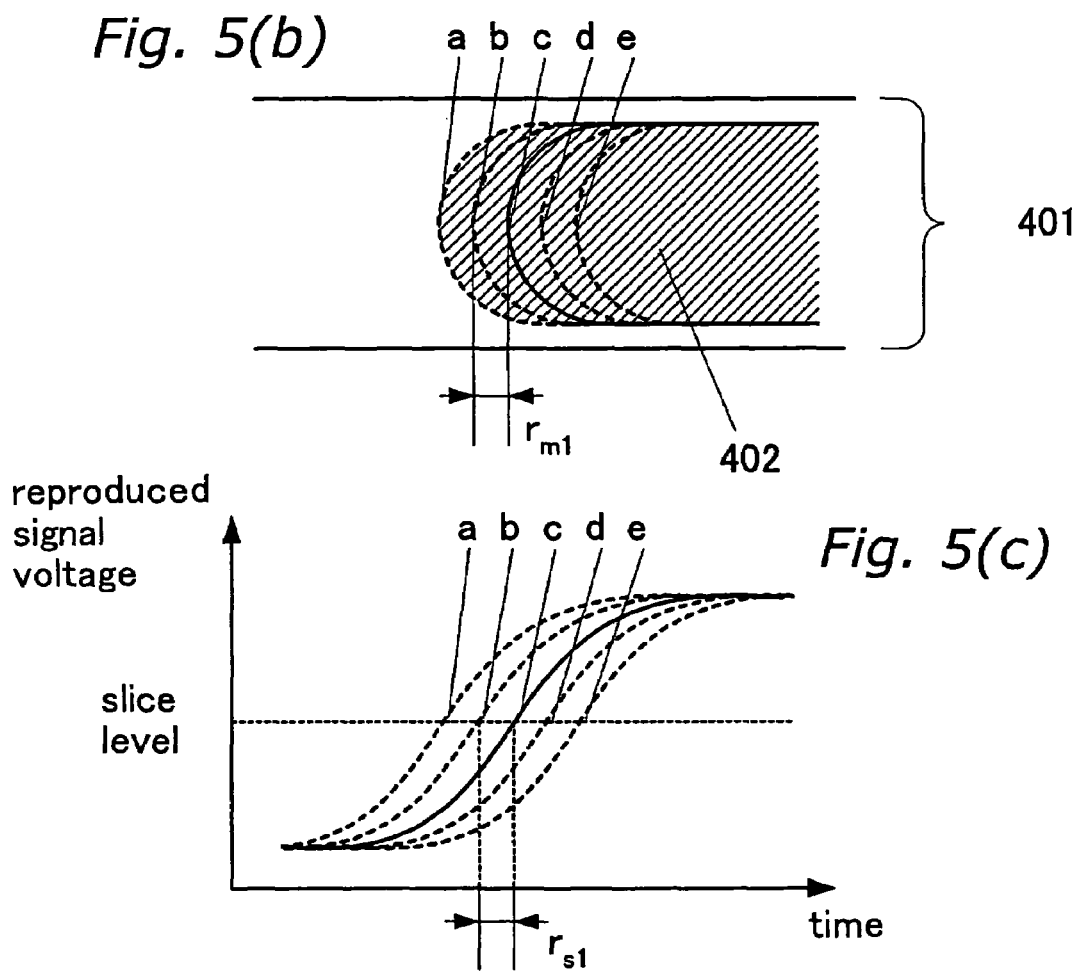
*Fig. 5(b)*
*Fig. 5(c)*

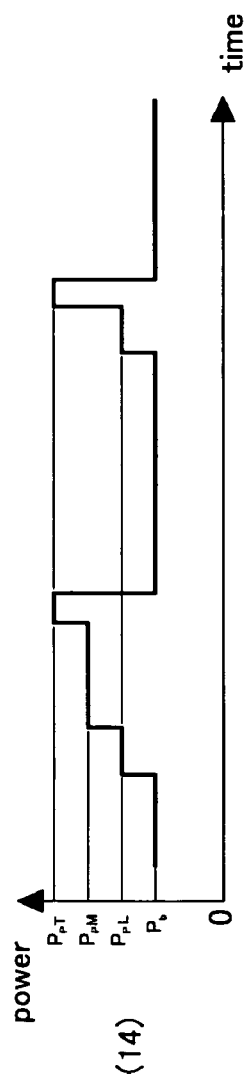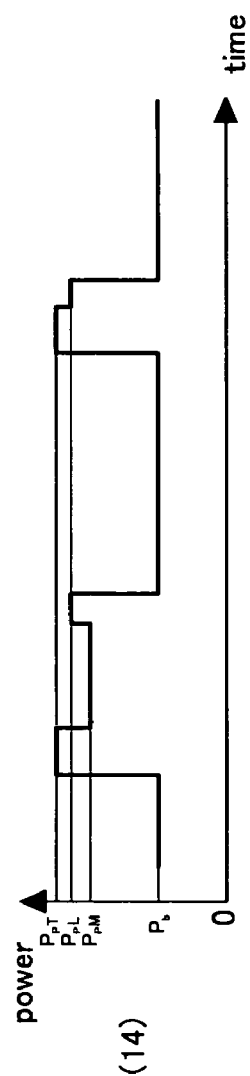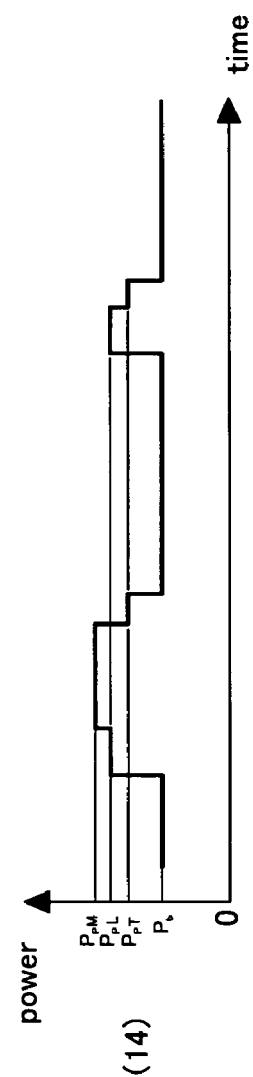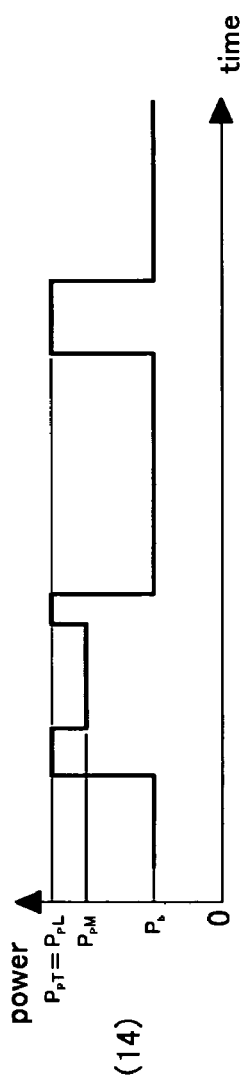

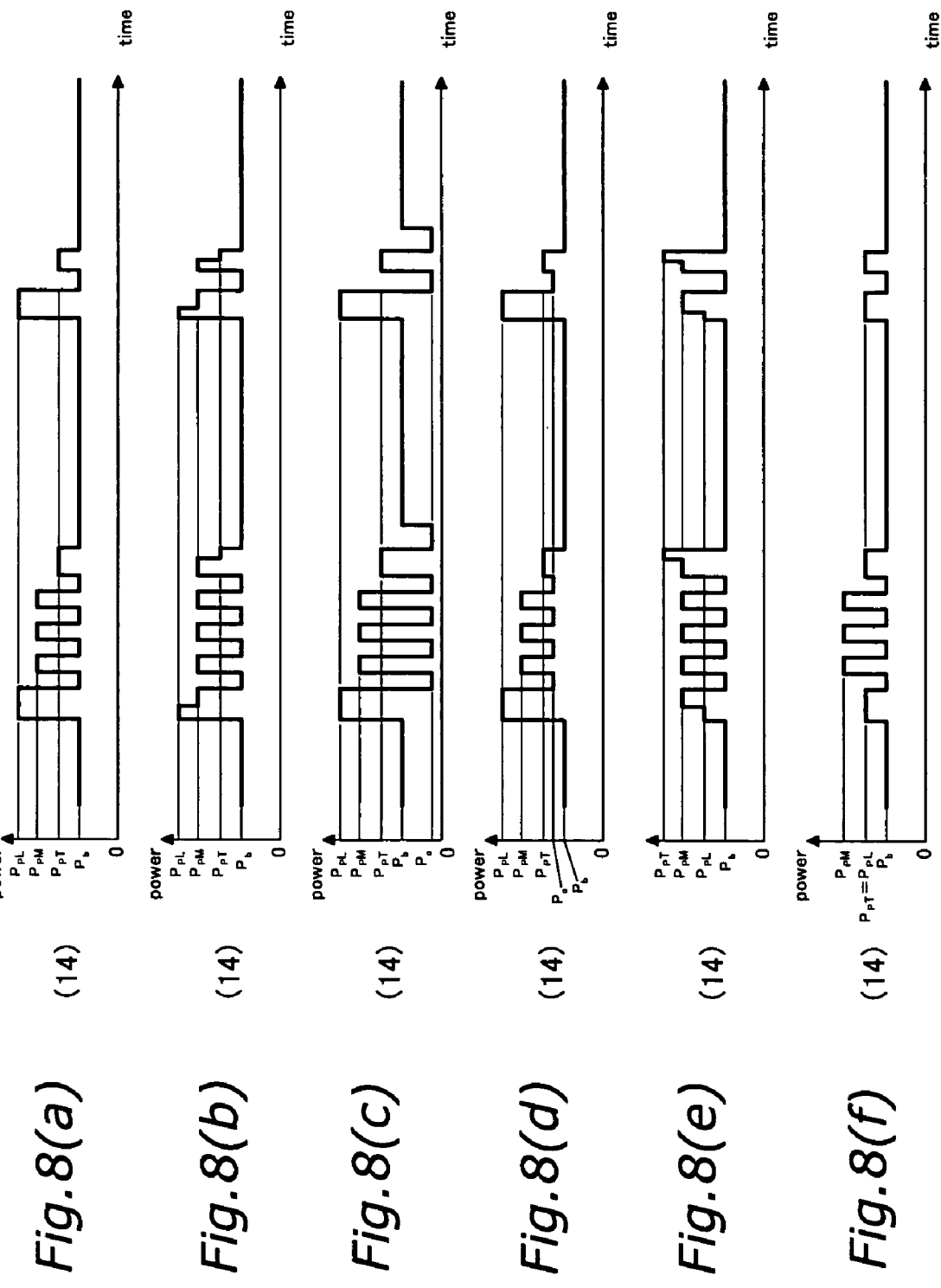

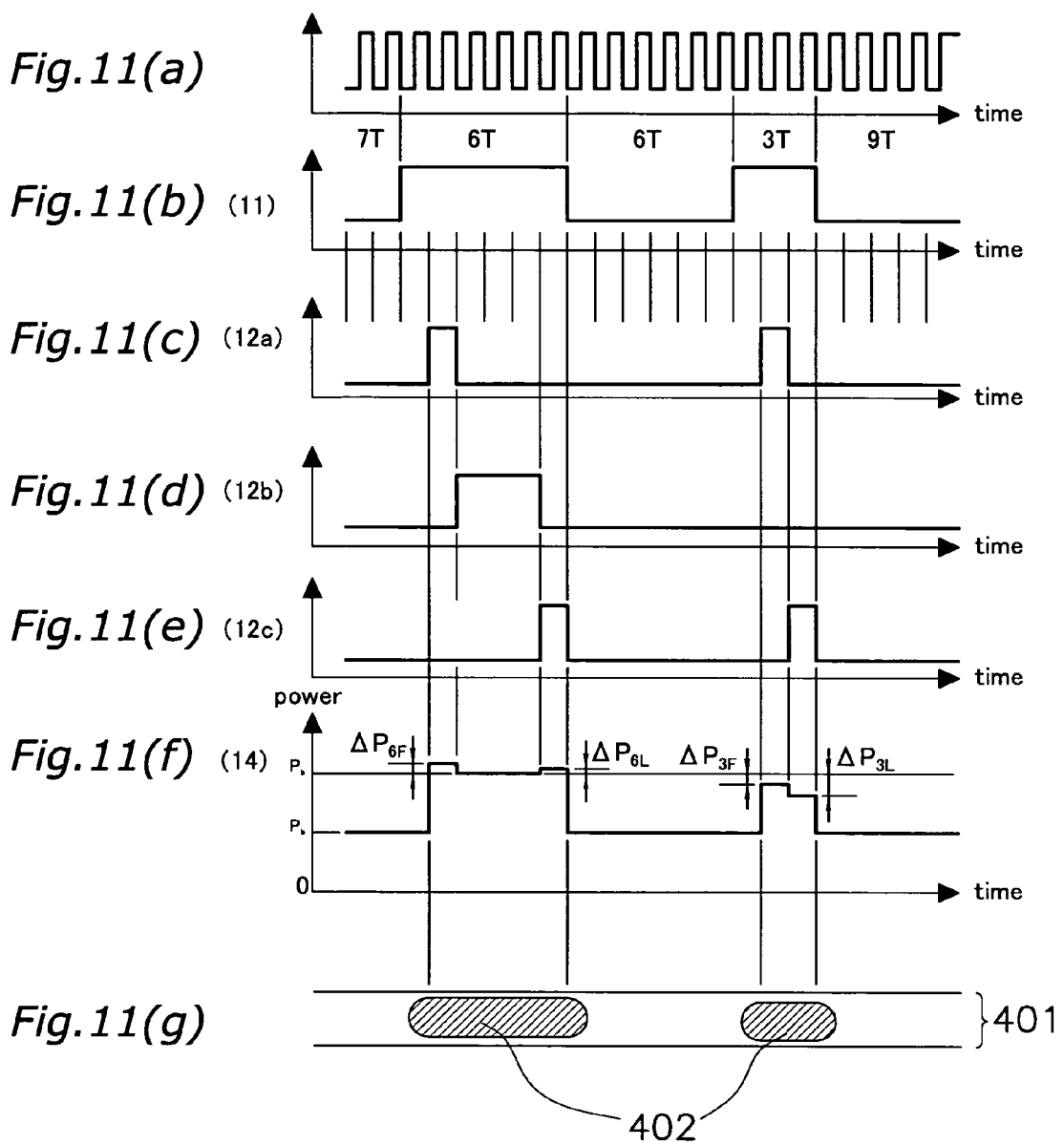

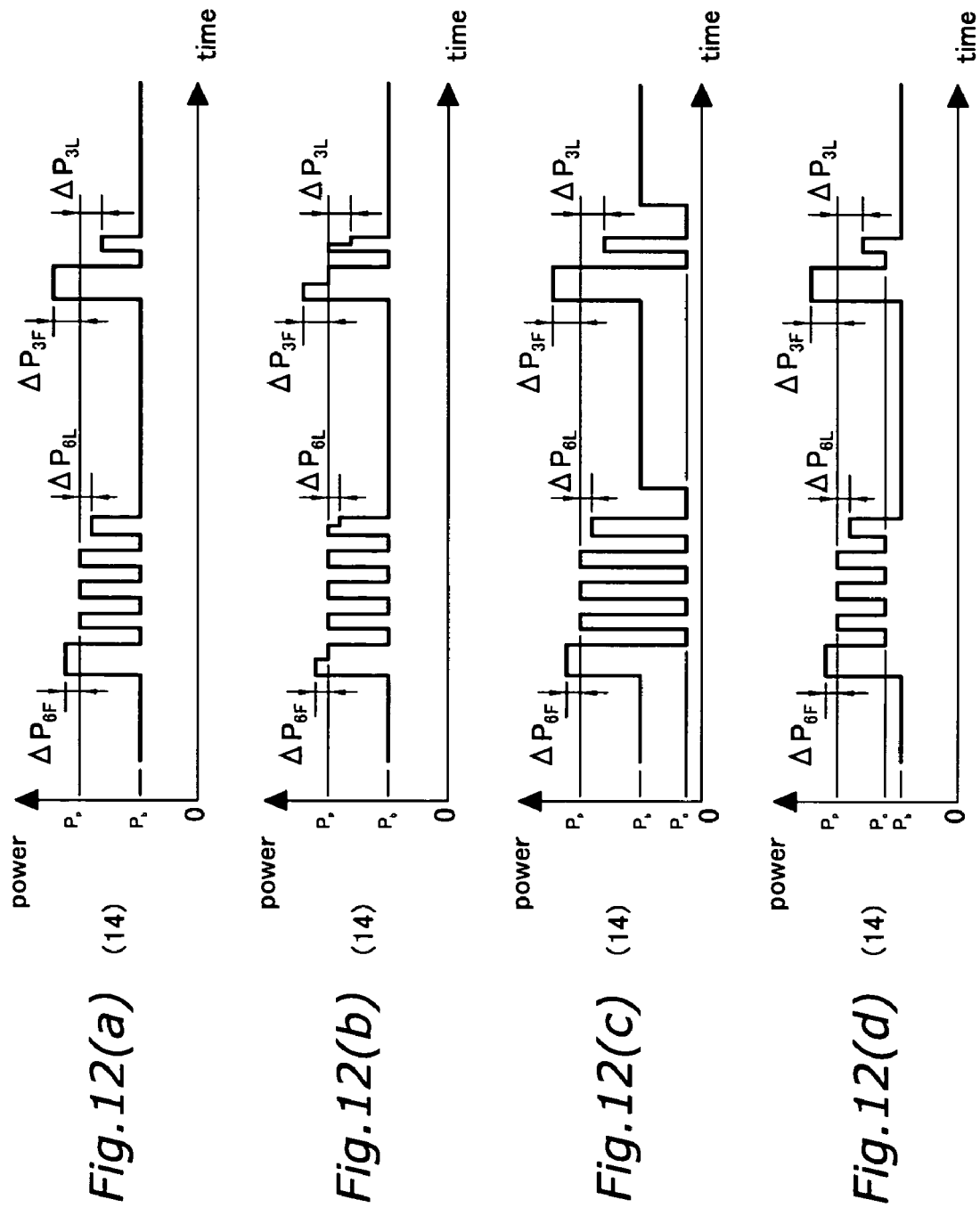

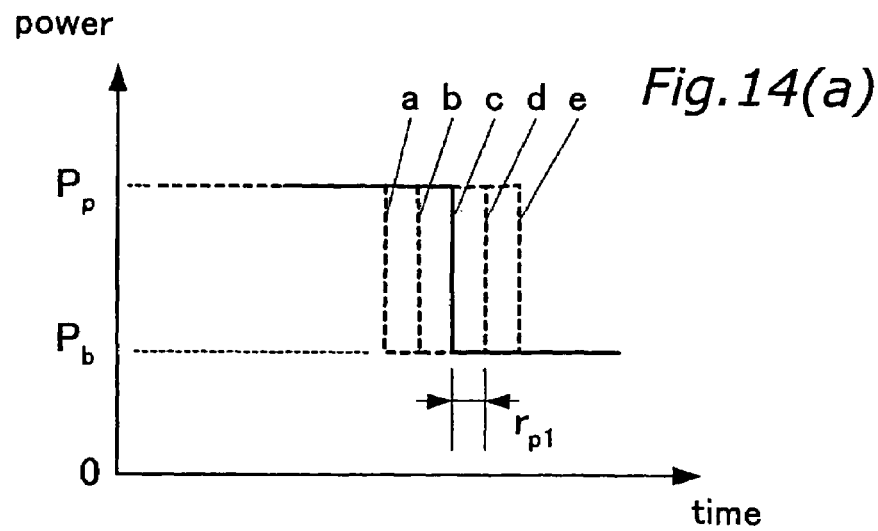
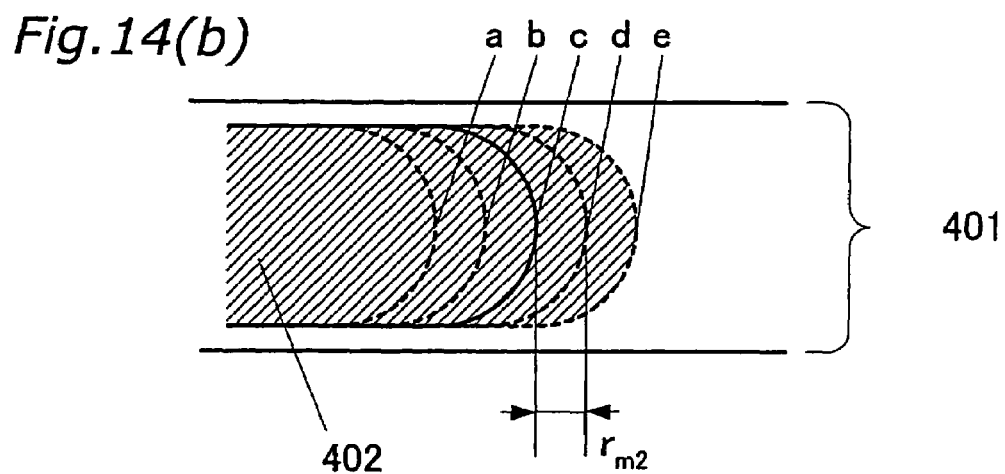
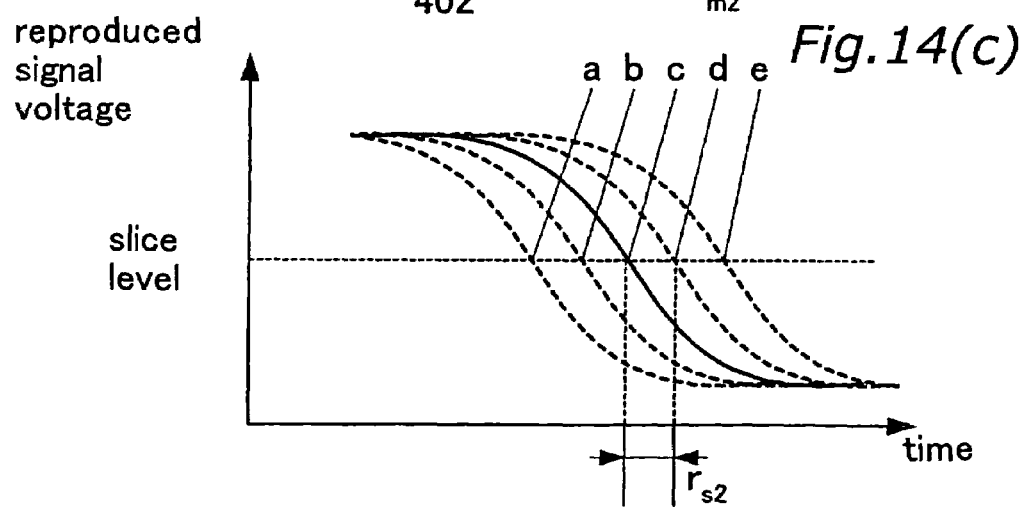

OPTICAL INFORMATION RECORDING METHOD, OPTICAL INFORMATION RECORDING DEVICE AND OPTICAL INFORMATION RECORDING MEDIUM

BACKGROUND OF THE INVENTION

1. Field of the Invention

The present invention relates to a recording method and a recording device for an optical information recording medium that optically records and reproduces data, and particularly to a method for generating a recording pulse waveform.

2. Description of the Prior Art

Recently, optical disks, optical cards and optical tapes have been proposed and developed as a medium for optically recording data. Among them the optical disk has received attention as a large-capacity medium that can record and reproduce much data at high density.

For example, a phase change type optical disk records and reproduces data by the method described below. A laser beam having a power higher than a reproducing power (this power level is called the recording power and is denoted by Pw) is focused by an optical head and applied to a recording film of the optical disk so that a temperature of the recording film is raised above its melting point. Then, the melted portion is cooled rapidly when the laser beam passes so that a mark is formed having an amorphous state. In addition, when a laser beam having a power such that it can raise the temperature of the recording film above a crystallizing temperature and below the melting point (this power level is called an erasing power and is denoted by Pe) is focused and applied, the applied portion of the recording film becomes crystalline.

Thus, a recording pattern including marks as amorphous areas and spaces as crystalline areas is formed corresponding to a data signal. Then, the data is reproduced by utilizing a difference of reflection factor between the crystalline area and the amorphous area.

As described above, in order to form marks on a medium, it is required to modulate the power level of the laser beam at least between the erasing power and the recording power for light emission. A pulse waveform that is used for this modulation operation is called a recording pulse. Various recording methods of forming one mark by using a plurality of recording pulses have already been disclosed. The plurality of recording pulses is called a recording pulse train. In addition, a recording method for modulating the power level of the laser beam between the recording power, the erasing power and a power lower than the erasing power (this power level is called a bottom power), which causes light to be emitted, is also disclosed. Furthermore, a recording method is also disclosed in which a recording pulse having a power lower than the erasing power (this pulse may also be called a cooling pulse) is added to the end of the recording pulse train.

In addition, a mark edge recording technique, that is a typical technique for DVDs and the like, utilizes a recording method in which a recording pulse is split into the above-mentioned recording pulse train when recording a long mark. A width of a first pulse (this is called a front end pulse) is set to a larger value than a width of a middle pulse or a last pulse (this is called a rear end pulse). Considering the effect of excessive heat that is conducted from a front portion of a mark, this reduces distortion of a shape of the recording mark for more accurate recording by decreasing the amount of heat that is applied to the recording film when recording the end portion of a mark lower than when recording a front portion of a mark.

In the case of the mark edge recording method, a difference in thermal characteristics of the optical disk affects the state of a recording mark and the level of thermal interference between recording marks. Namely, shapes of recording marks are different between disks even if the same recording pulse waveform is used for recording. As a result, a recording mark edge can be shifted from an ideal position depending on the disk, resulting in deterioration of quality of a reproduced signal.

Therefore, a method has been proposed in which a front end pulse edge position or a rear end pulse edge position is corrected to be at an optimal position for each disk so that recording marks can be recorded at ideal edge positions for each disk.

For example, there has been a method disclosed in which the front end pulse edge position or the rear end pulse edge position is corrected in accordance with a corrected value. The corrected value represents a combination of a code length corresponding to the mark to be recorded (this is called a record code length) and code lengths corresponding to the spaces before and after the mark (these are called a previous code length and a next code length, respectively) (for example, see Japanese unexamined patent publication No. 7-129959, pages 4-5 and FIG. 2).

In addition, there is also a test recording method disclosed for correcting the front end pulse edge position or the rear end pulse edge position. In this method, prior to recording a real information signal, a data pattern having a specific period (this is called a test pattern) is recorded. Then, the recorded test signal is reproduced so that the reproduced signal can be measured to determine a shift of a mark edge.

However, the above-mentioned conventional recording method has a problem that depending on a waveform of the recording pulse or thermal characteristics of the medium, variation in the actual mark edge becomes excessively sensitive or insensitive to the amount by which the edge position of the recording pulse is corrected. Hereinafter, the problem will be described.

For example, when recording on a medium having a structure that diffuses only little heat upon recording (this may also be called a slow cooling structure) by widening the recording pulse width, there is a tendency for the amount of variation of the mark edge to be smaller with respect to the amount of variation of the edge position of the recording pulse. This occurs because the effect of heat accumulated in the recording film of the medium is larger than the effect of the thermal variation due to the variation of the pulse edge.

As a result, even if the front end edge of the recording pulse is changed in a stepping manner by a resolution rp1 like a, b, c, d and e as shown in FIG. 13(a) for example, the actual mark edge variation becomes smaller than that, and a resolution of the edge position becomes rm2 as shown in FIG. 13(b). When this mark is reproduced, because the leading edge position of the reproduced signal corresponds to the mark edge position, the resolution rs2 of the leading edge position of the reproduced signal becomes smaller than rp1 as shown in FIG. 13(c).

Thus, if a medium is used that has the actual mark edge variation smaller than the edge position variation of the recording pulse, it is necessary to increase the number of setting steps of the edge position of the recording pulse so that the range in which the recording pulse edge position is set can be enlarged for forming marks having the desired mark edge positions. For this reason, it is required to use a delay line having higher numbers of setting steps, which leads to a complicated circuit and an increase of manufacturing cost.

On the other hand, when a width of the recording pulse for forming the mark edge is small, there is a tendency that the mark edge variation becomes larger than the edge position variation of the recording pulse, for example. This is because the recording pulse width varies relatively largely in accordance with the edge position variation of the recording pulse, so that the variation of the total energy that is used for forming mark edges is too large to be ignored.

As a result, if the rear end edge of the recording pulse is changed in a stepping manner by a resolution rp1 like a, b, c, d and e as shown in FIG. 14(a) for example the actual mark edge variation becomes larger than that, and a resolution of the edge position becomes rm2 as shown in FIG. 14(b). When this mark is reproduced, the resolution rs2 of the trailing edge position variation of the reproduced signal becomes larger than rp1 as shown in FIG. 14(c).

Thus, if a medium is used that has the actual mark edge variation larger than the edge position variation of the recording pulse, it is necessary to decrease a resolution of correction of the recording pulse edge position for forming marks having the desired mark edge positions. However, in order to decrease the resolution of correction, it is necessary to use a delay line having high accuracy in a circuit for correcting the record signal edge, which also leads to a complicated circuit and an increase of manufacturing cost.

In addition, if the correction amount of the edge position of the recording pulse is different from the actual mark edge variation, there may be many occasions where an expected correction amount of the mark edge cannot be obtained, even if the edge position of the recording pulse is corrected by the test recording. Therefore, the test recording may be repeated until the mark edge converges at a predetermined position. Thus, there is a problem that it takes a long time for the recording device to become really able to record data.

Furthermore, if a recording line speed of a medium and a channel clock frequency are increased so as to increase a transfer rate for recording, it becomes necessary to decrease the resolution of the correction of the edge position of the recording pulse, which leads to a complicated circuit and an increase in manufacturing cost in the same manner as described above.

SUMMARY OF THE INVENTION

An object of the present invention is to provide an optical information recording method in which information can be recorded precisely using a simple circuit structure.

In order to achieve the above-mentioned object, a first optical information recording method according to the present invention includes the steps of applying a laser beam to an optical information recording medium so that the optical characteristics of a photosensitive recording film are changed to form a mark or a space, recording in such a way that a length of the mark or the space corresponds to a record code length, and forming the mark with a recording pulse in which the power of the laser beam is changed between a plurality of power levels. The optical information recording method further includes the following steps:

a record signal generation step for identifying the record code length in accordance with a modulated signal and generating a record signal to be the recording pulse;

a record signal edge correction step for correcting an edge position of the recording pulse in accordance with the record code length for the record signal;

a record signal power level setting step for setting a power level of a front portion and/or a rear portion of the recording pulse to be different from a power level of a middle portion; and a laser driving step for driving a laser to emit the laser beam as the recording pulse in accordance with the corrected record signal.

In this optical information recording method, the edge position of the recording pulse is corrected, and power levels of the front portion and the rear portion of the recording pulse are different from a power level of the middle portion. Therefore, information can be recorded precisely using a simple circuit structure. Accordingly, if information is recorded by this optical information recording method, it is possible to improve the accuracy of recorded information and to suppress manufacturing cost without using a delay line having a lot of setting steps or a high precision delay line, for example.

In addition, in order to achieve the above-mentioned object, a second optical information recording method according to the present invention includes the steps of applying a laser beam to an optical information recording medium so that the optical characteristics of a photosensitive recording film are changed to form a mark or a space, recording in such a way that a length of the mark or the space corresponds to a record code length, and forming the mark with a recording pulse in which the power of the laser beam is changed between a plurality of power levels. The optical information recording method further includes the following steps:

a record signal generation step for identifying the record code length in accordance with a modulated signal and generating a record signal to be the recording pulse train;

a record signal edge correction step for correcting an edge position of the recording pulse train in accordance with the record code length for the record signal;

a record signal power level setting step for setting a power level of a front end pulse and/or a rear end pulse of the recording pulse train to be different from a power level of a middle pulse; and a laser driving step for driving a laser to emit the laser beam as the recording pulse train in accordance with the corrected record signal.

According to this optical information recording method, the edge position of the recording pulse train is corrected, and power levels of the front end pulse and the rear end pulse of the recording pulse train are made to be different from a power level of the middle pulse. Therefore, information can be recorded precisely using a simple circuit structure. Accordingly, if information is recorded by this optical information recording method, it is possible to improve the accuracy of recorded information and to suppress manufacturing cost without using a delay line having a lot of setting steps or a high precision delay line, for example.

In addition, in order to achieve the above-mentioned object, a third optical information recording method according to the present invention includes the steps of applying a laser beam to an optical information recording medium so that the optical characteristics of a photosensitive recording film are changed to form a mark or a space, recording in such a way that a length of the mark or the space corresponds to a record code length, and forming the mark with a recording pulse in which the power of the laser beam is changed between a plurality of power levels. The optical information recording method further includes the following steps:

a record signal generation step for deciding the record code length in accordance with a modulated signal and generating a record signal to be the recording pulse train;

a record signal edge correction step for correcting an edge position of the recording pulse train in accordance with the record code length for the record signal;

a record signal power level setting step for setting a power level of a front portion of a front end pulse and/or a rear portion of a rear end pulse of the recording pulse train to be different from a power level in-between the front portion of the front end pulse and the rear portion of the rear end pulse; and a laser driving step for driving a laser to emit the laser beam as the recording pulse train in accordance with the corrected record signal.

According to this optical information recording method, the edge position of the recording pulse train is corrected, and then a power level of the front portion of the front end pulse or the rear portion of the rear end pulse is made to be different from a power level of the middle pulse. Therefore, information can be recorded precisely using a simple circuit structure. Accordingly, if information is recorded by this optical information recording method, it is possible to improve the accuracy of recorded information and to suppress manufacturing cost without using a delay line having a lot of setting steps or a high precision delay line, for example.

In addition, regarding the first through third optical information recording methods of the present invention, it is preferable that the record signal edge correction step includes correcting the edge position of the recording pulse or the recording pulse train in accordance with a combination of the record code length and a length of a record code just before the record code, and/or a combination of the record code length and a length of a record code just after the record code. Note that the record code length here may include only the record code length of the mark, or may include both the record code length of the mark and the record code length of the space. In the latter case, record code lengths of spaces before and after the mark, the record code length of a mark before the mark to be recorded, and the like, may be considered for more precise correction.

In addition, regarding the first through third optical information recording methods of the present invention, it is preferable that: (i) the record code is recorded on the same optical information recording medium by at least two different channel clocks; and (ii) power levels of the recording pulse or the recording pulse train are equal to each other in the record signal power level setting step if the channel clock is at least the lowest frequency.

According to this optical information recording method, power levels are not different from each other in the recording pulse or the recording pulse train when at the lowest frequency. This is because it is not necessary to decrease the resolution of correction of the edge position of the recording pulse when at the lowest frequency.

In addition, a first optical information recording medium according to the present invention is an optical information recording medium on which data is recorded by the first through third recording methods of the present invention. This recording medium has a specific area in which information that indicates power levels of the recording pulse or the recording pulse train as well as the edge position of the recording pulse or the recording pulse train is recorded.

When using this optical recording medium, a test record can be performed just after the medium is inserted into a drive by reading out power level values and edge position values that are stored on the medium (and are appropriate to the medium), and set them as initial values for recording. Therefore, the time necessary for the test recording can be shortened and information can be recorded precisely compared with the case where values stored in the drive are used as initial values for recording.

In addition, in order to achieve the above-mentioned object, a first optical information recording device according to the present invention is a device for applying a laser beam to an optical information recording medium so that the optical characteristics of a photosensitive recording film are changed to form a mark or a space. The device records in such a way that a length of the mark or the space corresponds to a record code length and forms the mark with a recording pulse in which the power of the laser beam is changed between a plurality of power levels. The device includes a record signal generation circuit for identifying the record code length in accordance with a modulated signal and generating a record signal to be the recording pulse, a record signal edge correction circuit for correcting an edge position of the recording pulse in accordance with the record code length for the record signal, a record signal power level setting circuit that can set a power level of a front portion and/or a rear portion of the recording pulse to be different from a power level of a middle portion, and a laser driving circuit for driving a laser to emit the laser beam as the recording pulse in accordance with the corrected record signal. Note that, the circuits in this optical information recording device may, for example, be formed from at least one or more LSIs (large scale integrated circuits).

According to this optical information recording device, the record signal edge correction circuit corrects the edge position of the recording pulse, and the record signal power level setting circuit sets power levels of the front portion or the rear portion of the recording pulse different from a power level of the middle portion. Therefore, information can be recorded precisely using a simple circuit structure. Accordingly, it is possible to improve the accuracy of recorded information and to suppress manufacturing cost of the optical information recording device without using a delay line having a lot of setting steps or a high precision delay line, for example.

In addition, in order to achieve the above-mentioned object, a second optical information recording device according to the present invention is a device for applying a laser beam to an optical information recording medium so that the optical characteristics of a photosensitive recording film are changed to form a mark or a space. The device records in such a way that a length of the mark or the space corresponds to a record code length and forms the mark with a recording pulse in which the power of the laser beam is changed between a plurality of power levels. The device includes a record signal generation circuit for identifying the record code length in accordance with a modulated signal and generating a record signal to be the recording pulse train, a record signal edge correction circuit for correcting an edge position of the recording pulse train in accordance with the record code length for the record signal, a record signal power level setting circuit that can set a power level of a front end pulse and/or a rear end pulse of the recording pulse train to be different from a power level of a middle pulse, and a laser driving circuit for driving a laser to emit the laser beam as the recording pulse in accordance with the corrected record signal. Note that, the circuits in this optical information recording device may, for example, be formed from at least one or more LSIs (large scale integrated circuits).

According to this optical information recording device, the record signal edge correction circuit corrects the edge position of the recording pulse train, and the record signal power level setting circuit sets power levels of the front end pulse and the rear end pulse different from a power level of the middle pulse. Therefore, information can be recorded precisely using a simple circuit structure. Accordingly, it is possible to improve the accuracy of recorded information and to suppress manufacturing cost of the optical information recording device without using a delay line having a lot of setting steps or a high precision delay line, for example.

In addition, in order to achieve the above-mentioned object, a third optical information recording device according to the present invention is a device for applying a laser beam to an optical information recording medium so that the optical characteristics of a photosensitive recording film are changed to form a mark or a space. The device records in such a way that a length of the mark or the space corresponds to a record code length and forms the mark with a recording pulse in which the power of the laser beam is changed between a plurality of power levels. The device includes a record signal generation circuit for identifying the record code length in accordance with a modulated signal and generating a record signal to be the recording pulse train, a record signal edge correction circuit for correcting an edge position of the recording pulse train in accordance with the record code length for the record signal, a record signal power level setting circuit that can set a power level of a front portion of a front end pulse and/or a rear portion of a rear end pulse of the recording pulse train to be different from a power level in-between the front portion of the front end pulse and the rear portion of the rear end pulse, and a laser driving circuit for driving a laser to emit the laser beam as the recording pulse train in accordance with the corrected record signal. Note that, the circuits in this optical information recording device may, for example, be formed from at least one or more LSIs (large scale integrated circuits).

According to this optical information recording device, the record signal edge correction circuit corrects the edge position of the recording pulse train, and the record signal power level setting circuit sets a power level of the front portion of the front end pulse or the rear portion of the rear end pulse different from a power level of the middle pulse. Therefore, information can be recorded precisely using a simple circuit structure. Accordingly, it is possible to improve the accuracy of recorded information and to suppress manufacturing cost of the optical information recording device without using a delay line having a lot of setting steps or a high precision delay line, for example.

In addition, regarding the first through third optical information recording devices of the present invention, it is preferable that the record signal generation circuit generates the record signal that includes a plurality of pulse signals, the record signal edge correction circuit corrects at least a portion of the plurality of pulse signals, and the record signal power level setting circuit includes: a plurality of power level setting portions corresponding to the plurality of pulse signals; a plurality of drive current sources that respectively input power levels from the power level setting portions; and a plurality of switch circuits for turning on and off current from the plurality of drive current sources based upon the plurality of corrected pulse signals.

In addition, regarding the first through third optical information recording devices of the present invention, it is preferable that the record signal edge correction circuit corrects the edge position of the recording pulse or the recording pulse train in accordance with a combination of the record code length and a length of a record code just before the record code, and/or a combination of the record code length and a length of a record code just after the record code. Note that the record code length here may include only the record code length of the mark, or may include both the record code length of the mark and the record code length of the space. In the latter case, more precise correction can be performed for the record code length of a space, the record code length of a mark before the mark to be recorded, and the like.

In addition, regarding the first through third optical information recording devices according to the present invention, it is preferable that: (i) the record code is recorded on the same optical information recording medium by at least two different channel clocks; and (ii) the record signal power level setting circuit sets power levels of the recording pulse or the recording pulse train equal to each other if the channel clock is at least the lowest frequency.

According to this optical information recording device, power levels are not different from each other in the recording pulse or the recording pulse train when at the lowest frequency. This is because it is not necessary to decrease the resolution of correction of the edge position of the recording pulse or the recording pulse train when at the lowest frequency.

In addition, in order to achieve the above-mentioned object, a fourth optical information recording method according to the present invention includes the steps of applying a laser beam to an optical information recording medium so that the optical characteristics of a photosensitive recording film are changed to form a mark or a space, recording in such a way that a length of the mark or the space corresponds to a record code length, and forming the mark with a recording pulse in which the power of the laser beam is changed between a plurality of power levels. The optical information recording method further includes the following steps:

a record signal generation step for identifying the record code length in accordance with a modulated signal and generating a record signal to be the recording pulse;

a record signal power level setting step for setting a power level of a front portion and/or a rear portion of the recording pulse to be different from a power level of a middle portion;

a record signal power level correction step for correcting the power level of the front portion and/or the rear portion of the recording pulse in accordance with the record code length; and a laser driving step for driving a laser to emit the laser beam as the recording pulse in accordance with the record signal.

In this optical information recording device, power levels of the front portion and the rear portion of the recording pulse are made to be different from a power level of the middle portion, in accordance with the record code length. Therefore, information can be recorded precisely using a simple circuit structure and without using an edge correction circuit. Accordingly, if information is recorded by this optical information recording method, it is possible to improve the accuracy of recorded information and to suppress manufacturing cost without using a delay line having a lot of setting steps or a high precision delay line, for example.

In addition, in order to achieve the above-mentioned object, a fifth optical information recording method according to the present invention includes the steps of applying a laser beam to an optical information recording medium so that the optical characteristics of a photosensitive recording film are changed to form a mark or a space, recording in such a way that a length of the mark or the space corresponds to a record code length, and forming the mark with a recording pulse in which the power of the laser beam is changed between a plurality of power levels. The optical information recording method further includes the following steps:

a record signal generation step for identifying the record code length in accordance with a modulated signal and generating a record signal to-be the recording pulse train;

a record signal power level setting step for setting a power level of a front end pulse and/or a rear end pulse of the recording pulse train to be different from a power level of a middle pulse;

a record signal power level correction step for correcting the power level of the front end pulse and/or the rear end pulse in accordance with the record code length; and a laser driving step for driving a laser to emit the laser beam as the recording pulse train in accordance with the record signal.

In this optical information recording method, power levels of the front end pulse and the rear end pulse are made to be different from a power level of the middle pulse in accordance with the record code length. Therefore, information can be recorded precisely using a simple circuit structure and without using an edge correction circuit. Accordingly, if information is recorded by this optical information recording method, it is possible to improve the accuracy of recorded information and to suppress manufacturing cost without using a delay line having a lot of setting steps or a high precision delay line, for example.

In addition, in order to achieve the above-mentioned object, a sixth optical information recording method according to the present invention includes the steps of applying a laser beam to an optical information recording medium so that the optical characteristics of a photosensitive recording film are changed to form a mark or a space, recording in such a way that a length of the mark or the space corresponds to a record code length, and forming the mark with a recording pulse in which the power of the laser beam is changed between a plurality of power levels. The optical information recording method further includes the following steps:

a record signal generation step for identifying the record code length in accordance with a modulated signal and generating a record signal to be the recording pulse train;

a record signal power level setting step for setting a power level of a front portion of a front end pulse and/or rear portion of a rear end pulse of the recording pulse train to be different from a power level in-between the front portion of the front end pulse and the rear portion of the rear end pulse;

a record signal power level correction step for correcting the power level of the front portion of the front end pulse and/or the rear portion of the rear end pulse of the recording pulse train in accordance with the record code length; and a laser driving step for driving a laser to emit the laser beam as the recording pulse train in accordance with the record signal.

In this optical information recording method, a power level of the front portion of the front end pulse or the rear portion of the rear end pulse is made to be different from a power level of the middle portion, in accordance with the record code length. Therefore, information can be recorded precisely using a simple circuit structure and without using an edge correction circuit. Accordingly, if information is recorded by this optical information recording method, it is possible to improve the accuracy of recorded information and to suppress manufacturing cost without using a delay line having a lot of setting steps or a high precision delay line, for example.

In addition, regarding the fourth through sixth optical information recording methods according to the present invention, it is preferable that the record signal power level correction step includes correcting the power level of the recording pulse or the recording pulse train in accordance with a combination of the record code length and a length of a record code just before the record code, and/or a combination of the record code length and a length of a record code just after the record code. Note that the record code length here may include only the record code length of the mark, or may include both the record code length of the mark and the record code length of the space. In the latter case, more precise correction can be performed for the record code length of a space, the record code length of a mark before the mark to be recorded, and the like.

In addition, regarding the fourth through sixth optical information recording methods according to the present invention, it is preferable that: (i) the record code is recorded on the same optical information recording medium by at least two different channel clocks; and (ii) all power levels of the recording pulse or the recording pulse train are made equal to each other in the record signal power level correction step if the channel clock is at least the lowest frequency.

In this optical information recording method, power levels are not different from each other in the recording pulse or the recording pulse train when at the lowest frequency. This is because it is not necessary to decrease the resolution of correction of the edge position of the recording pulse or the recording pulse train when at the lowest frequency.

In addition, a second optical information recording medium according to the present invention is an optical information recording medium on which record signs are recorded by the fourth through sixth recording methods according to the present invention. The second optical information recording medium has a specific area in which information that indicates power levels of the recording pulse or the recording pulse train is recorded.

When using this optical information recording medium, a test record is performed after reading out power level values that are stored on the medium and are appropriate to the medium, and set them as initial values for recording. Therefore, the time necessary for the test recording can be shortened and information can be recorded precisely.

In addition, in order to achieve the above-mentioned object, a fourth optical information recording device according to the present invention is an optical information recording device for applying a laser beam to an optical information recording medium so that the optical characteristics of a photosensitive recording film are changed to form a mark or a space. The device records in such a way that a length of the mark or the space corresponds to a record code length and forms the mark with a recording pulse in which the power of the laser beam is changed between a plurality of power levels. The device includes a record signal generation circuit for identifying the record code length in accordance with a modulated signal and generating a record signal to be the recording pulse;

a record signal power level setting circuit that can set a power level of a front portion and/or a rear portion of the recording pulse to be different from a power level of a middle portion;

a record signal power level correction circuit for correcting the power level of the front portion and/or the rear portion of the recording pulse in accordance with the record code length; and a laser driving circuit for driving a laser to emit the laser beam as the recording pulse in accordance with the record signal. Note that, the circuits in this optical information recording device may, for example, be formed from at least one or more LSIs (large scale integrated circuits).

In this optical information recording device, the record signal power level correction circuit corrects power levels of the front portion and the rear portion of the recording pulse in accordance with the record code length. Therefore, information can be recorded precisely using a simple circuit structure and without using an edge correction circuit. Accordingly, it is possible to improve the accuracy of recorded information and to suppress manufacturing cost of the optical information recording device without using a delay line having a lot of setting steps or a high precision delay line, for example.

In addition, in order to achieve the above-mentioned object, a fifth optical information recording device according to the present invention is an optical information recording device for applying a laser beam to an optical information recording medium so that the optical characteristics of a photosensitive recording film are changed to form a mark or a space. The device records in such a way that a length of the mark or the space corresponds to a record code length and forms the mark with a recording pulse in which the power of the laser beam is changed between a plurality of power levels. The device includes:

a record signal generation circuit for identifying the record code length in accordance with a modulated signal and generating a record signal to be the recording pulse train;

a record signal power level setting circuit that can set a power level of a front end pulse and/or a rear end pulse of the recording pulse train to be different from a power level of a middle pulse;

a record signal power level correction circuit for correcting a power level of the front end pulse and/or the rear end pulse in accordance with the record code length; and a laser driving circuit for driving a laser to emit the laser beam as the recording pulse train in accordance with the record signal. Note that, the circuits in this optical information recording device may, for example, be formed from at least one or more LSIs (large scale integrated circuits).

In this optical information recording device, the record signal power level correction circuit corrects power levels of the front end pulse and the rear end pulse of the recording pulse train in accordance with the record code length. Therefore, information can be recorded precisely using a simple circuit structure and without using an edge correction circuit. Accordingly, it is possible to improve the accuracy of recorded information and to suppress manufacturing cost of the optical information recording device without using a delay line having a lot of setting steps or a high precision delay line, for example.

In addition, in order to achieve the above-mentioned object, a sixth optical information recording device according to the present invention is an optical information recording device for applying a laser beam to an optical information recording medium so that the optical characteristics of a photosensitive recording film are changed to form a mark or a space. The device records in such a way that a length of the mark or the space corresponds to a record code length and forms the mark with a recording pulse in which the power of the laser beam is changed between a plurality of power levels. The device includes:

a record signal generation circuit for identifying the record code length in accordance with a modulated signal and generating a record signal to be the recording pulse train;

a record signal power level setting circuit that can set a power level of a front portion of a front end pulse and/or a rear portion of a rear end pulse of the recording pulse train to be different from a power level in-between the front portion of the front end pulse and the rear portion of the rear end pulse;

a record signal power level correction circuit for correcting a power level of the front portion of the front end pulse and/or the rear portion of the rear end pulse in accordance with the record code length; and a laser driving circuit for driving a laser to emit the laser beam as the recording pulse train in accordance with the record signal. Note that, the circuits in this optical information recording device may, for example, be formed from at least one or more LSIs (large scale integrated circuits).

In this optical information recording device, the record signal power level correction circuit corrects power levels of the front portion of the front end pulse or the rear portion of the rear end pulse of the recording pulse train in accordance with the record code length. Therefore, information can be recorded precisely using a simple circuit structure and without using an edge correction circuit. Accordingly, it is possible to improve the accuracy of recorded information and to suppress manufacturing cost of the optical information recording device without using a delay line having a lot of setting steps or a high precision delay line, for example.

In addition, regarding the fourth through sixth optical information recording devices of the present invention, it is preferable that the record signal generation circuit generates the record signal that includes a plurality of pulse signals, the record signal power level setting circuit includes a plurality of power level setting portions corresponding to the plurality of pulse signals, a plurality of drive current sources to which power levels are output from the power level setting portions respectively, and a plurality of switch circuits for turning on and off current from the plurality of drive current sources in accordance with the plurality of pulse signals, and the record signal power level correction circuit includes a plurality of power level correction portions for outputting a corrected signal to at least a portion of the plurality of power level setting portions.

In addition, regarding the fourth through sixth optical information recording devices of the present invention, it is preferable that the record signal power level correction circuit corrects the power level of the recording pulse or the recording pulse train in accordance with a combination of the record code length and a length of a record code just before the record code, and/or a combination of the record code length and a length of a record code just after the record code. Note that, the record code length here may include only the record code length of the mark, or may include both the record code length of the mark and the record code length of the space. In the latter case, more precise correction can be performed for the record code length of a space, the record code length of a mark before the mark to be recorded, and the like.

In addition, regarding the fourth through sixth optical information recording devices of the present invention, it is preferable that: (i) the record code is recorded on the same optical information recording medium by at least two different channel clocks; and (ii) the record signal power level correction circuit corrects power levels of the recording pulse or the recording pulse train to be equal to each other if the channel clock is at least the lowest frequency.

In this optical information recording device, power levels are not different from each other in the recording pulse or the recording pulse train when at the lowest frequency. This is because it is not necessary to decrease the resolution of correction of the edge position of the recording pulse or the recording pulse train when at the lowest frequency.

As described above, according to the optical information recording method of the present invention, the edge position of the recording pulse or the recording pulse train is corrected. Then, a power level of the front portion or the rear portion of the recording pulse or the recording pulse train is made to be different from a power level of the middle portion, so that information can be recorded precisely using a simple circuit structure.

In addition, according to the optical recording method of the present invention, a power level of the front portion or the rear portion of the recording pulse or the recording pulse train is corrected in accordance with the record code length. Therefore, information can be recorded precisely using a simple circuit structure and without using an edge correction circuit.

BRIEF DESCRIPTION OF THE DRAWINGS

FIG. 4 shows waveforms of signals demonstrating an operation of the recording and reproducing device according to the first embodiment.

FIG. 5 is a diagram showing the relationship between a recording pulse waveform when recording a front portion of a mark, a recording mark and a reproduced signal in the first embodiment.

FIG. 7 shows waveforms of the recording pulse in another example of the first embodiment.

FIG. 8 shows waveforms of the recording pulse in still another example of the first embodiment.

FIG. 11 shows waveforms of signals demonstrating an operation of the recording and reproducing device according to the second embodiment.

FIG. 12 shows waveforms of the recording pulse in another example of the second embodiment.

FIG. 14 is a diagram showing the relationship between a recording pulse waveform when recording a rear portion of a mark, a recording mark and a reproduced signal in the conventional structure.

DESCRIPTION OF THE PREFERRED EMBODIMENTS

Hereinafter, embodiments of the present invention will be described with reference to drawings.

A point of the present invention is to form a mark edge at a desired position by changing a power level of the front portion and/or the rear portion of the recording pulse without decreasing a resolution of correction of the recording pulse or increasing a set area of the recording pulse edge position.

Structure of a First Embodiment

First, an operation of recording information by an optical information recording and reproducing method according to a first embodiment of the present invention will be described with reference to FIGS. 1-6.

Figure 1:
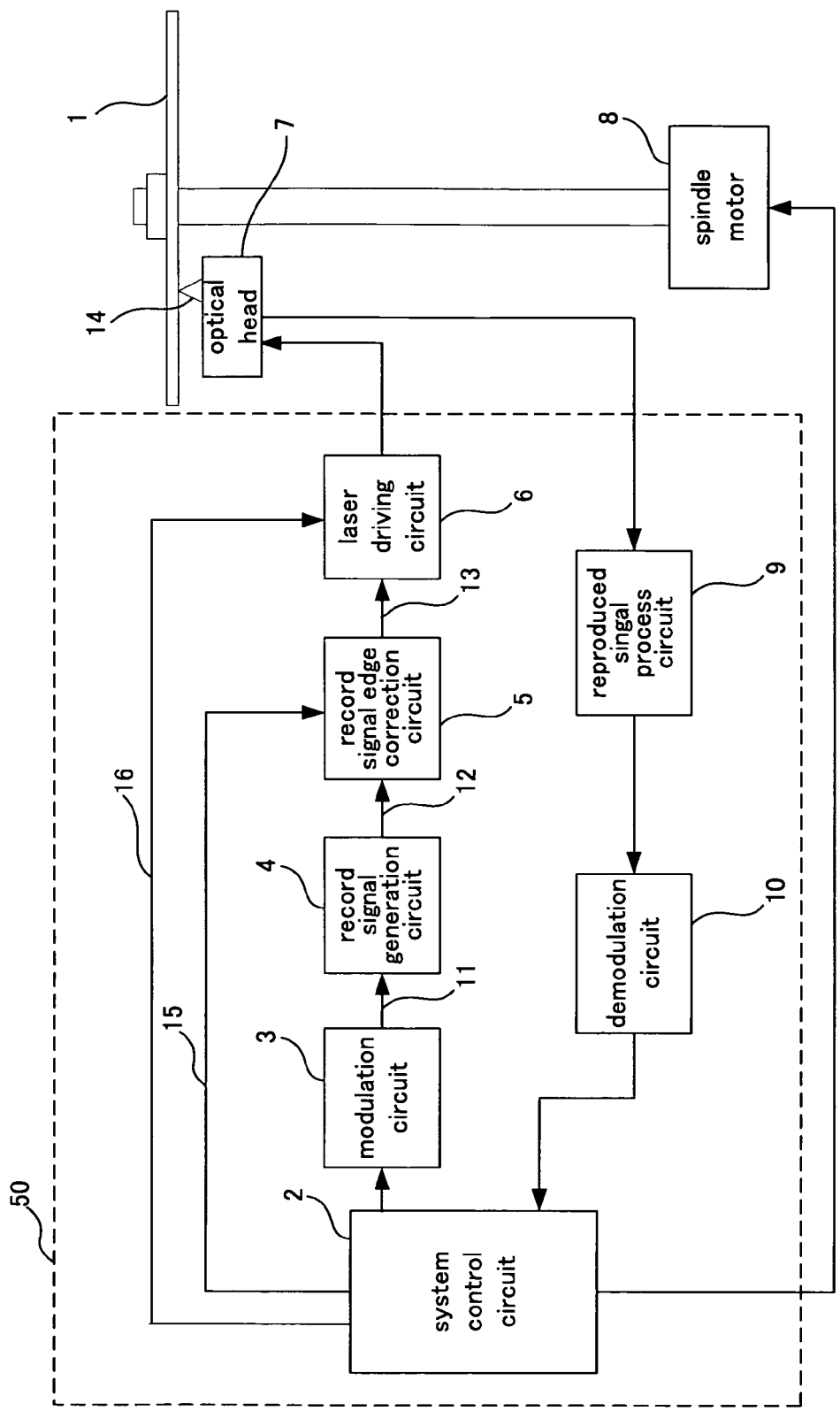
FIG. 1 is a block diagram showing a structure of a recording and reproducing device according to a first embodiment of the present invention.

FIG. 1 is a block diagram showing a general structure of a recording and reproducing device according to an embodiment of the present invention.

Numeral 1 denotes an optical disk on which information is recorded and reproduced, numeral 2 denotes a system control circuit for controlling the entire of the recording and reproducing device. Numeral 3 denotes a modulation circuit for generating a modulated signal 11 (a record data signal) that is binarized in accordance with information to be recorded. Numeral 4 denotes a record signal generation circuit for generating and dividing a record signal 12 that becomes the basis for driving a laser 307 in accordance with the modulated signal 11, and dividing the record signal 12 into a front end pulse signal 12a, a middle pulse signal 12b and a rear end pulse signal 12c. Numeral 5 denotes a record signal edge correction circuit for correcting the front end pulse edge position and the rear end pulse edge position of the record signal 12. Numeral 6 denotes a laser driving circuit for modulating current for driving the laser 307 in an optical head 7 (a pick up) in accordance with a corrected record signal 13 and for determining a power level of the laser 307. Numeral 7 denotes the optical head, which irradiates the optical disk 1 with a laser beam as a recording pulse 14. Numeral 8 denotes a spindle motor for rotating the optical disk 1. Numeral 9 denotes a reproduced signal process circuit for processing a waveform of a reproduced signal in accordance with a reflected beam from the optical disk 1. And numeral 10 denotes a demodulation circuit for obtaining reproduced information. Note that the plurality of circuits that constitute the recording and reproducing device of the first embodiment (the system control circuit 2, the modulation circuit 3, the record signal generation circuit 4, the record signal edge correction circuit 5, the laser driving circuit 6, the reproduced signal process circuit 9, and the demodulation circuit 10) are formed from at least one or more LSIs 50 (large scale integrated circuits).

Figure 2:
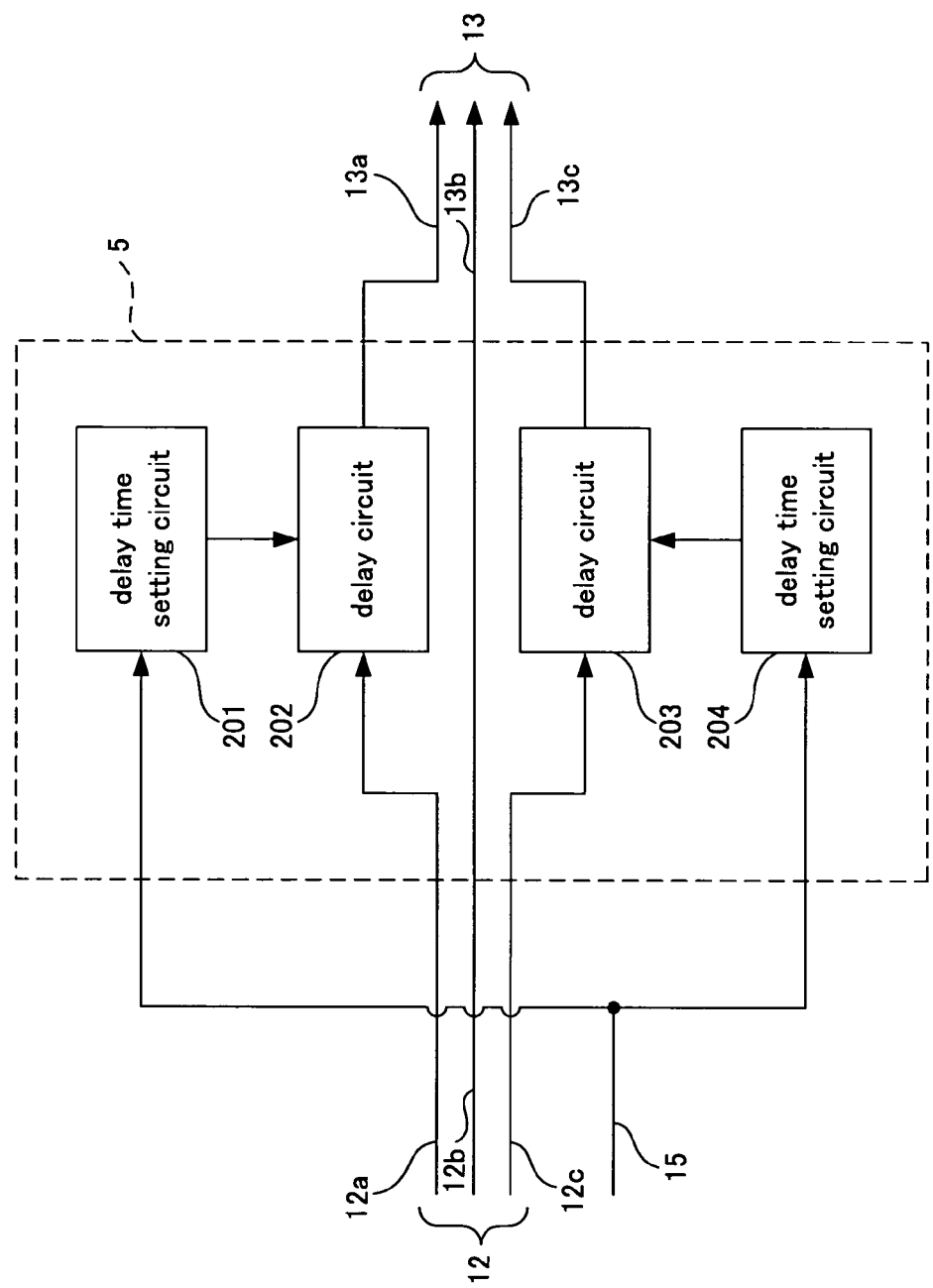
FIG. 2 is a block diagram showing a structure of a record signal edge correction circuit of the recording and reproducing device according to the first embodiment.

FIG. 2 is a structural diagram showing the record signal edge correction circuit 5 shown in FIG. 1 in more detail. The record signal edge correction circuit 5 includes delay time setting circuits 201 and 204 for setting delay time of pulse edges of the front end pulse signal 12a and the rear end pulse signal 12c of the record signal 12, and delay circuits 202 and 203 for actually delaying the pulse edge.

Figure 3:
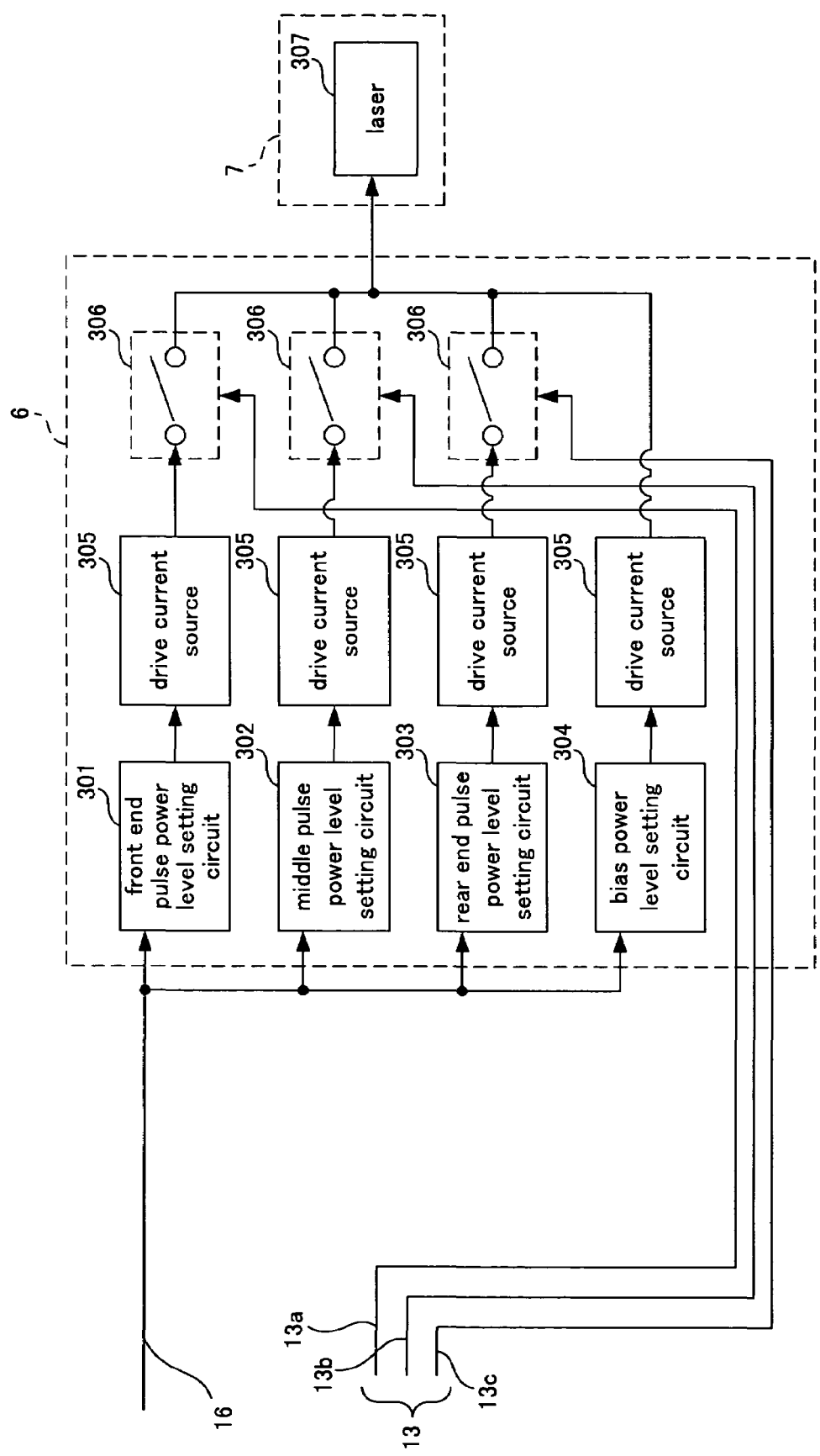
FIG. 3 is a block diagram showing a structure of a laser driving circuit of the recording and reproducing device according to the first embodiment.

FIG. 3 is a structural diagram showing the laser driving circuit 6 and the optical head 7 shown in FIG. 1 in more detail. The laser driving circuit 6 includes a front end pulse power level setting circuit 301, a middle pulse power level setting circuit 302, and a rear end pulse power level setting circuit 303. The front end pulse power level setting circuit 301, the middle pulse power level setting circuit 302 and the rear end pulse power level setting circuit 303 are circuits for setting power levels of the front end pulse signal 12a, the middle pulse signal 12b and the rear end pulse signal 12c, respectively. In addition, the laser driving circuit 6 also includes a bias power level setting circuit 304 for setting a bias power level, drive current sources 305 for supplying drive current to the laser, and switch circuits 306 for modulating the power level. A plurality of the drive current sources 305 are provided corresponding to the power level setting circuits 301-304, respectively. The switch circuits 306 are provided corresponding to the power level setting circuits 301-303, respectively. The optical head 7 includes the laser 307.

FIG. 4 shows waveforms of signals from portions shown in FIGS. 1-3 of the first embodiment of the present invention. Note that, each of the following embodiments shows an example in the case of recording using a modulation method in which the shortest record code length is 3T and the longest record code length is 11 T.

FIG. 4(*a*) shows a waveform of a channel clock signal to be the basis for generating a record signal. FIG. 4(*b*) shows a waveform of a modulated signal output from the modulation circuit 3 (11 in FIG. 1). FIG. 4(*c*) shows a waveform of a front end pulse signal output from the record signal generation circuit 4 (12a in FIG. 2). FIG. 4(*d*) shows a waveform of a front end pulse signal after the edge position is corrected (13a in FIGS. 2 and 3). FIG. 4(*e*) shows a waveform of a middle pulse signal output from the record signal generation circuit 4 (12b and 13b in FIG. 2, 13b in FIG. 3). FIG. 4(*f*) shows a waveform of a rear end pulse signal output from the record signal generation circuit 4 (12c in FIG. 2). FIG. 4(*g*) shows a waveform of a rear end pulse signal after the edge position is corrected (13c in FIGS. 2 and 3). FIG. 4(*h*) shows a waveform of a recording pulse 14 emitted by the optical head 7. FIG. 4(*i*) shows the marks 402 recorded on a track 401 of the optical disk 1.

Note that FIG. 4 shows signal waveforms of the portions and the recorded state on the track when recording and reproducing the signal that is modulated in 7T space (that is represented by 7Ts), 6T mark (that is represented by 6Tm), 6T space (6Ts), 3T mark (3Tm) and 9T space (9Ts).

(Operation of the First Embodiment)

Next, an operation of recording information will be described. From the system control circuit 2 shown in FIG. 1, record information is supplied to the modulation circuit 3. Then, the record information is modulated and binarized in synchronization with the channel clock (see FIG. 4(*a*)) to become the modulated signal 11 (see FIG. 4(*b*)). The modulated signal 11 is supplied to the record signal generation circuit 4.

The record signal generation circuit 4 detects the record code length from the modulated signal 11 and generates the record signal 12 in accordance with the record code length at a predetermined timing. This record signal 12 includes the front end pulse signal 12a (see FIG. 4(*c*)), the middle pulse signal 12b (see FIG. 4(*e*)), and the rear end pulse signal 12c (see FIG. 4(*f*)), which are independently supplied to the record signal edge correction circuit 5. Note that the generation of the middle pulse signal 12b is not required in the case of a short record code length, like the case where the record code length 3 T is recorded in this embodiment.

In order to form the front end edge and the rear end edge of the recording mark at a predetermined position, the record signal edge correction circuit 5 corrects the front end edge position of the front end pulse and the rear end edge position of the rear end pulse. They are respectively corrected as shown in FIG. 4(*d*) and FIG. 4(*g*) by the delay circuits 202 and 203 shown in FIG. 2. The corrected record signal 13 is supplied to the laser driving circuit 6 as the front end pulse signal 13a and the rear end pulse signal 13c. In this embodiment, the middle pulse signal 12b is not corrected, so the middle pulse signal 13b that is the same as the middle pulse signal 12b from the record signal generation circuit 4 is supplied to the laser driving circuit 6. In addition, the delay time values in the delay circuits 202 and 203 are set by the delay time setting circuits 201 and 204. The delay time is determined by a test record, for example, and is stored in a memory in the system control circuit 2. The delay time setting circuits 201 and 204 are controlled by a delay time set signal 15 from the system control circuit 2.

In the present embodiment, the record signal edge correction circuit 5 performs the optimal correction in accordance with the record code length of a mark to be recorded. Namely, the record signal edge correction circuit 5 corrects the front edge of the front end pulse by Δ6F and the rear edge of the rear end pulse by Δ6L for the record code length 6T, while it corrects the front edge of the front end pulse by Δ3F and the rear edge of the rear end pulse by Δ3L for the record code length 3T. However, the correction may be performed in accordance with: a combination of a mark to be recorded and a record code length of a space before the mark; a combination of a mark to be recorded and a record code length of a mark that is recorded before the mark to be recorded; a combination of a mark to be recorded and a record code length of a space after the mark; and a combination of a mark to be recorded and a record code length of a mark that is recorded after the mark to be recorded, and the like. In this case, more precise correction can be performed for a record code length of a space before or after the mark and/or a mark before or after the space.

The corrected record signal 13 includes the front end pulse signal 13a, the middle pulse signal 13b and the rear end pulse signal 13c, which are supplied to the laser driving circuit 6 independently. This record signal 13 controls each of the switch circuits 306 in the laser driving circuit 6, so as to modulate a power level of current from each of the drive current sources 305. Note that, each of the power level setting circuits 301-303 is supplied with a power level control signal 16 from the system control circuit 2. It is different from the conventional structure in that the power level setting circuits 301-303 and the drive current sources 305 are provided independently for each of the front end pulse, the middle pulse and the rear end pulse. Thus, the laser driving circuit 6 can make a power level of the front end pulse and a power level of the rear end pulse after the edge position correction different from a power level of the middle pulse. As a result, the waveform of the recording pulse 14 as shown in FIG. 4(*h*) can be obtained. When the laser 307 is driven in accordance with this waveform, marks 402 can be formed on the record track 401 as shown in FIG. 4 (*i*). Note that, the laser driving circuit 6 can also make a power level of the front end pulse and a power level of the rear end pulse after the edge position correction equal to a power level of the middle pulse.

The effect of making a power level of the front end pulse and a power level of the rear end pulse after the edge position correction different from a power level of the middle pulse will be described below.

Figure 13A:
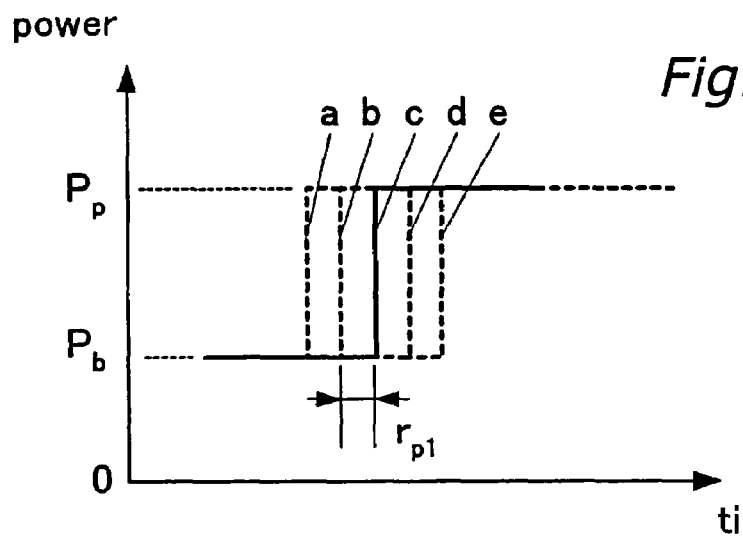
FIG. 13 is a diagram showing the relationship between a recording pulse waveform when recording a front portion of a mark, a recording mark and a reproduced signal in the conventional structure.
Figure 13B:
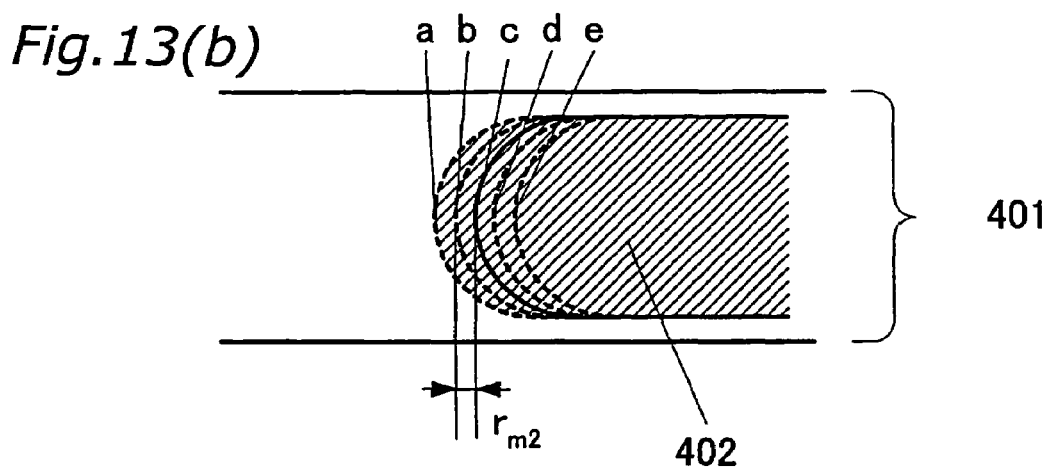
Figure 13C:
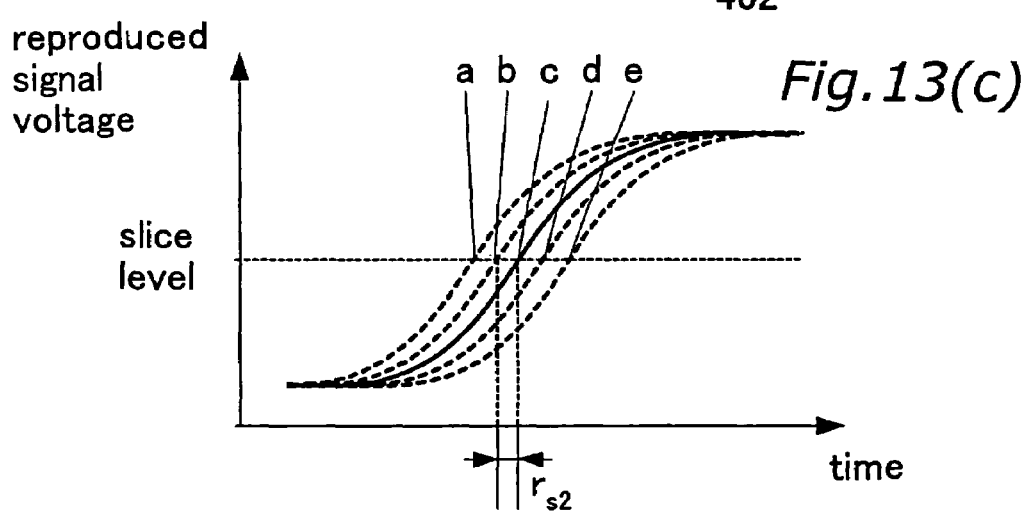

For example, as shown in FIG. 13 of the conventional structure, if an edge of the recording mark 402, i.e., change of the time at the leading edge of the reproduced signal, is insensitive to a change of the front end edge of the front end pulse, the power level PpL of the first pulse is made to be higher than the power level PpM of the middle pulse as shown in FIG. 5(*a*). Then, even if the front end edge of the front end pulse is changed at the same resolution rp1, a change of thermal energy that is applied to the optical disk 1 becomes larger than the conventional example. Therefore, as shown in FIGS. 5(b) and 5(c), the resolution rm1 of the change of the front end edge of the recording mark 402 and the resolution rs1 of the change of the time at the leading edge of the reproduced signal, can be larger than the conventional example, so that the resolutions rp1 and rs1 can be equal to each other. As a result, it is not necessary to increase the number of setting steps of the edge position of the recording pulse to form a mark at a desired mark edge position, so the structure of the record signal edge correction circuit 5 can be simplified. In addition, when performing the test record to correct the edge position of the recording pulse, a desired correction amount of the mark edge can be obtained. Therefore, it is possible to shorten the time necessary for the mark edge to converge at a predetermined position as well as the time necessary for the recording device to be actually ready for recording.

Figure 6A:
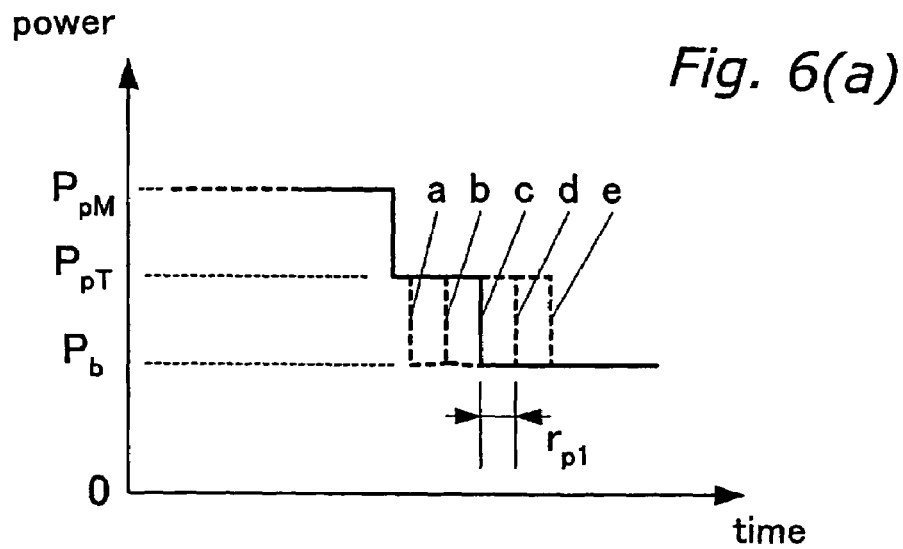
FIG. 6 is a diagram showing the relationship between a recording pulse waveform when recording a rear portion of a mark, a recording mark and a reproduced signal in the first embodiment.
Figure 6B:
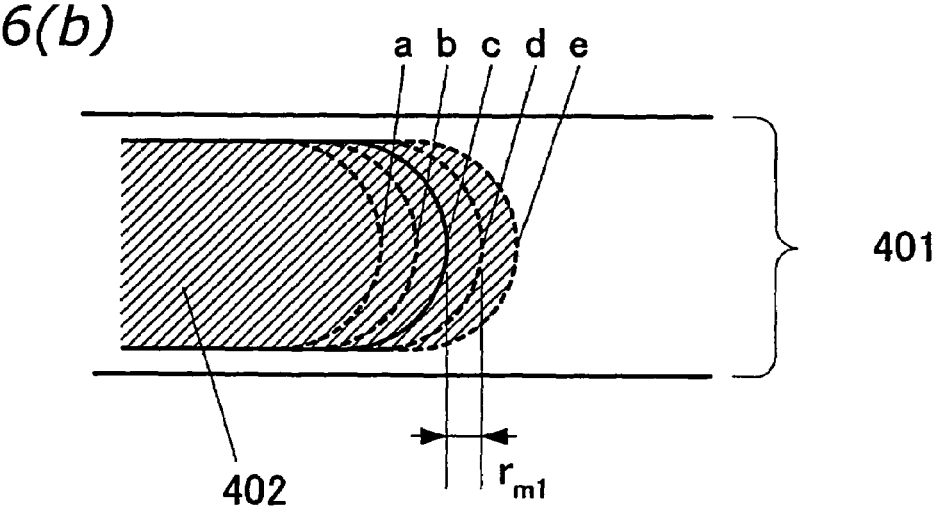
Figure 6C:
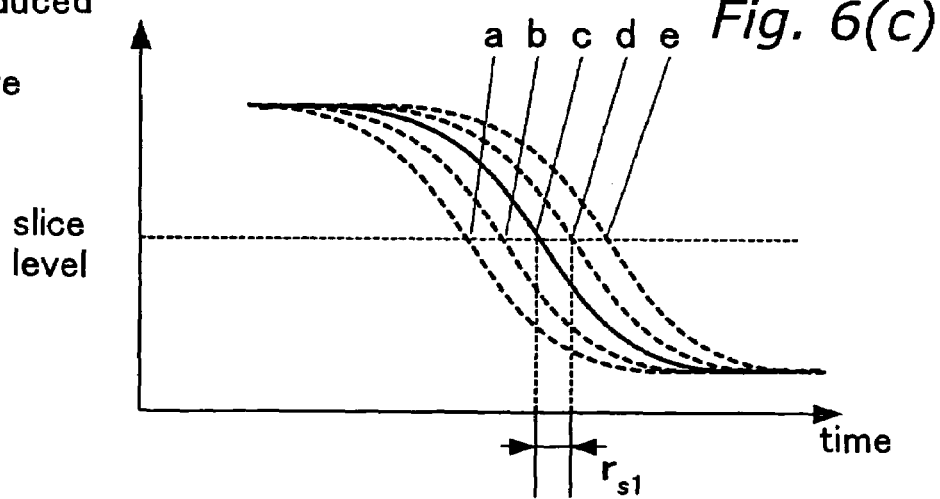

On the contrary, as shown in FIG. 14, if the edge of the recording mark 402, i.e., the change of the time at the leading edge of the reproduced signal, is too sensitive to a change of the rear end edge of the rear end pulse, the power level PpT of the rear end pulse is made to be lower than the power level PpM of the middle pulse as shown in FIG. 6(a). Then, a change of thermal energy that is applied to the optical disk 1 becomes smaller than in the conventional example. Therefore, as shown in FIGS. 6(b) and 6(c), the resolution rm1 and rs1 can be small, so that the resolutions rp1 and rs1 can be equal to each other. As a result, it is not necessary to decrease a set resolution of the edge position of the recording pulse to form a mark at a desired mark edge position, so the structure of the record signal edge correction circuit 5 can be simplified. In addition, in the same way as the above-mentioned case, it is possible to shorten the time necessary for the mark edge to converge at a predetermined position in the test record as well as the time necessary for the recording device to be actually ready for recording.

As described above, the edge position of the recording pulse is corrected, and power levels of the front end pulse and the rear end pulse are made to be different from a power level of the middle pulse in this embodiment. Thus, information can be recorded and reproduced correctly using a simple circuit structure, and a test record can be performed efficiently in a short time.

Note that though the power level PpL of the front end pulse is set to be higher than the middle pulse PpM, and the power level PpT of the rear end pulse is set to be lower than the middle pulse PpM in this embodiment, a power level in the present invention is not limited to this relationship, but can be set to have any relationship. For example, if a change of the front end edge of the recording mark is sensitive and a change of the rear end edge is insensitive, a recording pulse waveform may be used in which the power level PpL of the front end pulse is set to be low, and the power level PpT of the rear end pulse is set to be high as shown in FIG. 7(a). In the same way, in accordance with recording conditions such as a width of the recording pulse or a recording density, thermal conditions of the medium, and the like, power levels of both the front end pulse and the rear end pulse may be set to be high, as shown in FIG. 7(b). Otherwise, as shown in FIG. 7(c), power levels of both the front end pulse and the rear end pulse may be set to be low. In both cases, the desired effect can be obtained. In addition, if the power levels PpT and PpL are set to the same value, as shown in FIG. 7(d), the number of power levels necessary for modulating the laser can be decreased, and a structure of the laser driving circuit can be simplified.

In addition, though the front end pulse, the middle pulse and the rear end pulse constitute one recording pulse together in this embodiment, it is possible to obtain the same effect by generating a plurality of recording pulses (which are called a recording pulse train) between the bias power level Pb and each of the power levels PpL, PpM and PpT that are higher than the bias power level Pb, as shown in FIG. 8 (a). The middle pulse may be generated as a multipulse with different numbers of pulses in accordance with the record code length.

Furthermore, it is possible to make only a power level of the front portion of the front end pulse or the rear portion of the rear end pulse in the recording pulse train different from the power level PpM of the middle pulse, as shown in FIG. 8(b). In addition, it is possible to obtain the same effect by decreasing the power level Pc between the recording pulses to be lower than the bias power level Pb, or to provide a pulse (that may also be called a cooling pulse) having a lower power level Pc than the bias power level Pb after the recording pulse train, as shown in FIG. 8(c), or to increase the power level Pc between the recording pulses higher than the bias power level Pb, as shown in FIG. 8(d).

Of course, the relationship of power levels PpL, PpM and PpT is not limited to the illustrated relationship for the recording pulses shown in FIGS. 8(a)-8(d). In addition, for example, as one variation corresponding to the recording pulse shown in FIG. 8(b), it is possible to set only the power level of the front portion of the front end pulse to be a low value different from the power level PpM of the middle pulse, and to set only the power level of the rear portion of the rear end pulse to be a high value different from the power level PpM of the middle pulse. These levels are set in accordance with a recording condition, such as a width of the recording pulse or a record density, thermal condition of a medium and the like, as shown in FIG. 8(e). In this case too, the desired effect can be obtained. Furthermore, if the power levels PpT and PpL are set to be the same power levels, as shown in FIG. 8(f), the number of power levels necessary for modulating the laser can be reduced, and so the structure of the laser driving circuit can be simplified.

In addition, though the corrected portions of the edge position of the recording pulse are the front end edge of the front end pulse and the rear end edge of the rear end pulse in this embodiment, it is possible to correct other edge positions where a position of the mark edge can be corrected. For example, in FIG. 8(c), it is possible to correct the rear end edge of the cooling pulse or to correct both the rear end edge of the cooling pulse and the rear end edge of the rear end pulse simultaneously in order to correct the rear end edge position of the mark.

Second Embodiment

An operation when recording information by the optical information recording and reproducing method according to a second embodiment of the present invention will be described with reference to FIGS. 9-12.

Figure 9:
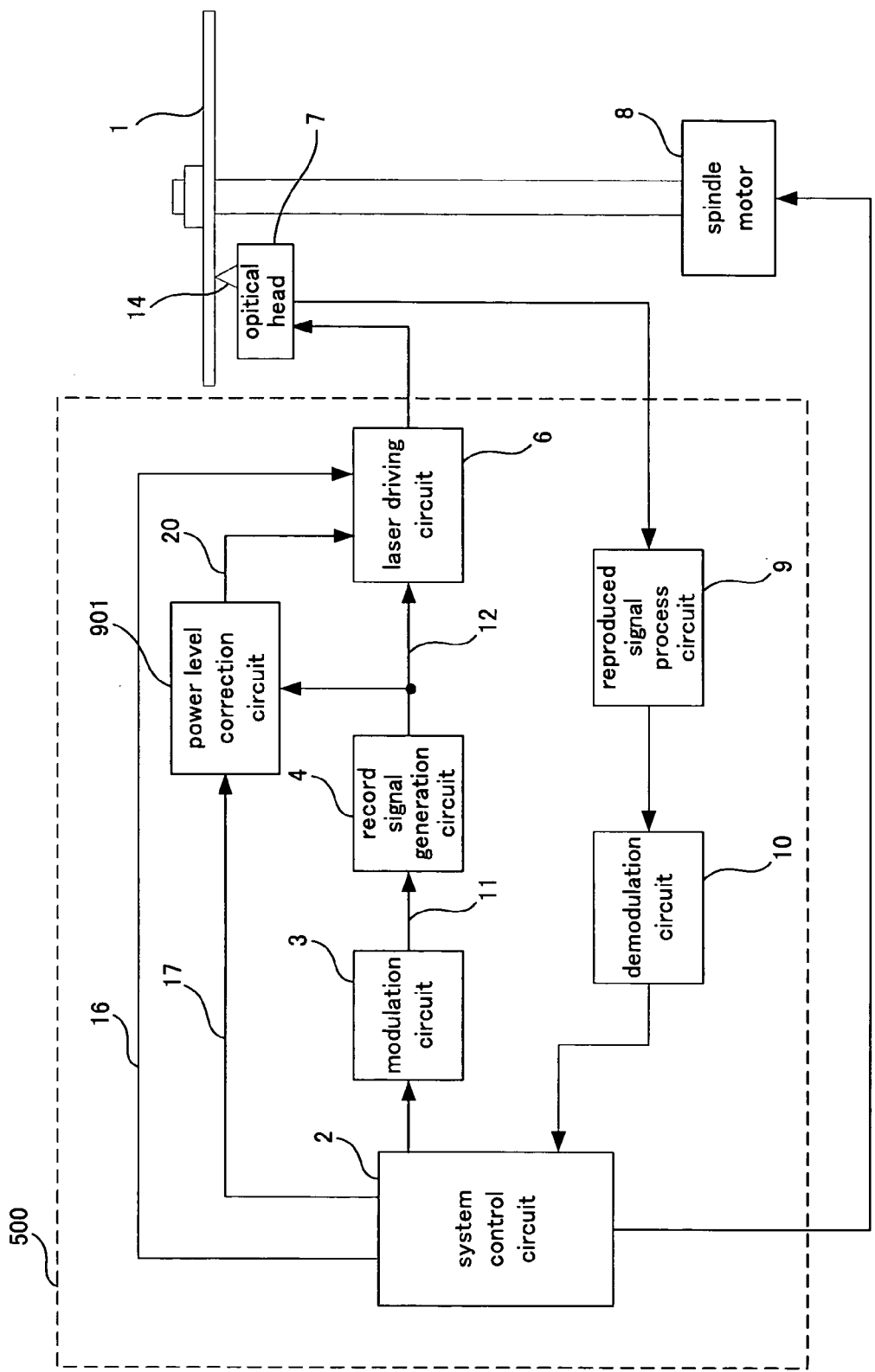
FIG. 9 is a block diagram showing a structure of a recording and reproducing device according to a second embodiment of the present invention.

FIG. 9 is a block diagram showing a general structure of a recording and reproducing device according to this embodiment. This is different from the structure of the recording and reproducing device of the first embodiment (shown in FIG. 1) in that a record signal power level correction circuit 901 is provided instead of the record signal edge correction circuit 5, so as to correct a power level of the recording pulse in the laser driving circuit 6 in accordance with the record code length. Note that the plurality of circuits that constitute the recording and reproducing device of the second embodiment (the system control circuit 2, the modulation circuit 3, the record signal generation circuit 4, the power level correction circuit 901, the laser driving circuit 6, the reproduced signal process circuit 9 and the demodulation circuit 10) are formed from at least one or more LSIs 500 (large scale integrated circuits).

Figure 10:
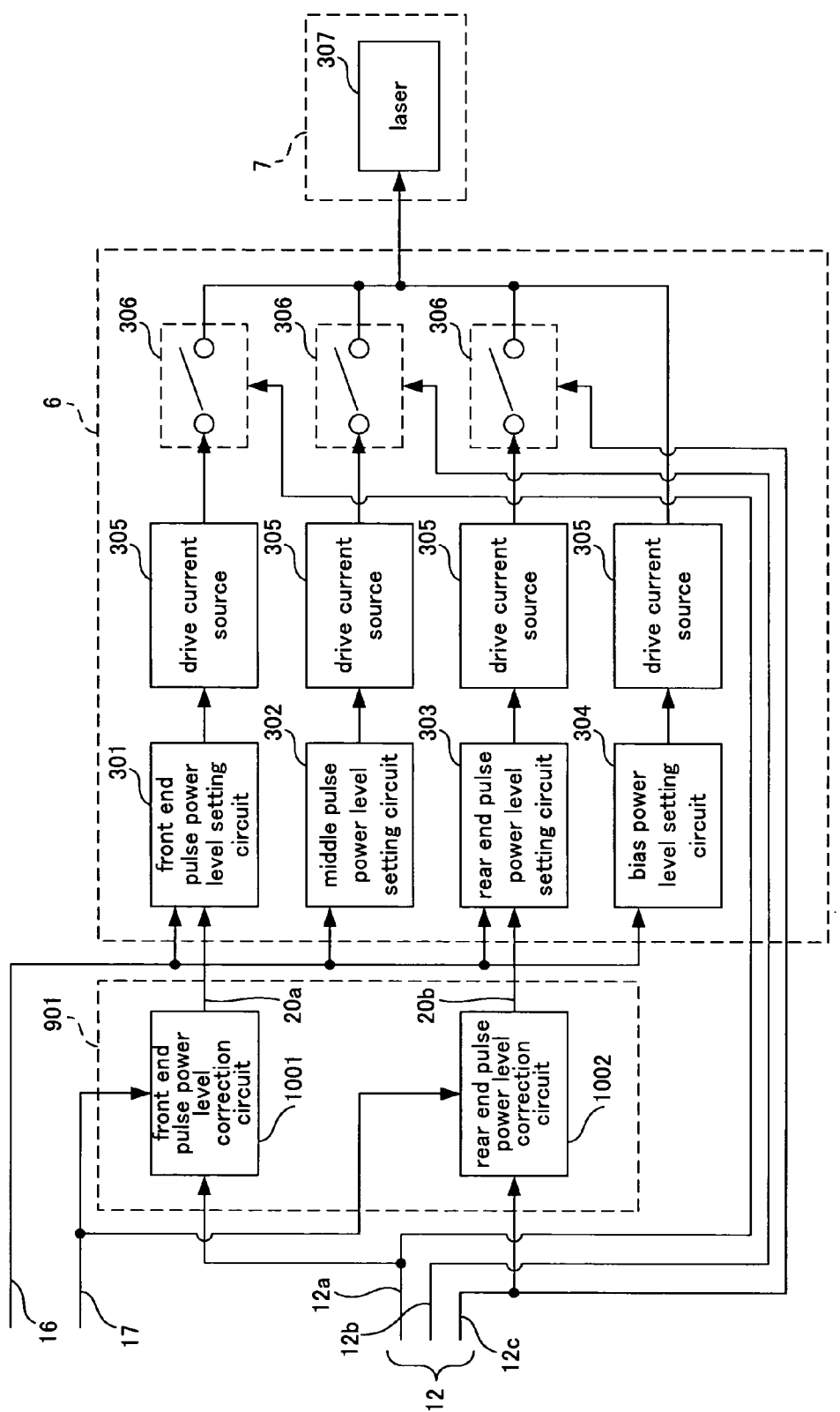
FIG. 10 is a block diagram showing structures of a power level correction circuit and a laser driving circuit of the recording and reproducing device according to the second embodiment.

FIG. 10 is a structural diagram showing the record signal power level correction circuit 901 and the laser driving circuit 6 in more detail. The record signal power level correction circuit 901 is provided with a power level correction amount set signal 17 from the system control circuit 2, and a record signal 12 from the record signal generation circuit 4, so as to output a power level corrected signal 20 to the laser driving circuit 6. The record signal power level correction circuit 901 includes a front end pulse power level correction circuit 1001 and a rear end pulse power level correction circuit 1002. The front end pulse power level correction circuit 1001 is a circuit for correcting a power level that is set by the front end pulse power level setting circuit 301 in the laser driving circuit 6. Front end pulse power level correction circuit 1001 is controlled by the power level correction amount set signal 17 and the front end pulse signal 12a so as to output a power level corrected signal 20a to the laser driving circuit 6. The rear end pulse power level correction circuit 1002 is a circuit for correcting a power level that is set by the rear end pulse power level setting circuit 302 in the laser driving circuit 6. Rear end pulse power level correction circuit 1002 is controlled by the power level correction amount set signal 17 and the rear end pulse signal 12c so as to output a power level corrected signal 20b to the laser driving circuit 6.

(Operation of the Second Embodiment)

An operation when recording information in the second embodiment will be described. The system control circuit 2 shown in FIG. 9 outputs record information to the modulation circuit 3. Then, the record information is modulated and is binarized in synchronization with the channel clock (see FIG. 11(a)) to become the modulated signal 11 (see FIG. 11(b)). The modulated signal 11 is supplied to the record signal generation circuit 4.

The record signal generation circuit 4 detects the record code length from the modulated signal 11 and generates the record signal 12 at a predetermined timing in accordance with the record code length. This record signal 12 includes the front end pulse signal 12a (see FIG. 11(c)), the middle pulse signal 12b (see FIG. 11(d)), and the rear end pulse signal 12c (see FIG. 11(e)), which are independently supplied to the record signal power level correction circuit 901 and the laser driving circuit 6. Note that, the middle pulse signal 12b is not supplied to the record signal power level correction circuit 901 in this embodiment.

In order to form the front end edge and the rear end edge of the recording mark at a predetermined position, the front end pulse power level correction circuit 1001, the rear end pulse power level correction circuit 1002 shown in FIG. 10 correct a power level of the front end pulse signal 12a and a power level of the rear end pulse signal 12c respectively, as shown in FIG. 11(f). More specifically, a correction amount of the power level is, for example, determined by the test record and stored in a memory in the system control circuit 2. Thus, the front end pulse power level correction circuit 1001 and the rear end pulse power level correction circuit 1002 are controlled by the power level correction amount set signal 17 from the system control circuit 2. Still more specifically, a front end pulse power level corrected signal 20a is supplied from the front end pulse power level correction circuit 1001 to the front end pulse power level setting circuit 301. In addition, a rear end pulse power level corrected signal 20b is supplied from the rear end pulse power level correction circuit 1002 to the rear end pulse power level setting circuit 302.

In this embodiment, a power level is corrected to be an optimum value in accordance with a record code length of a mark to be recorded. Namely, regarding the record code length 6T, a power level of the front end pulse is corrected by $\Delta$P6F, and a power level of the rear end pulse is corrected by $\Delta$P6L, while regarding the record code length 3T, a power level of the front end pulse is corrected by $\Delta$P3F, and a power level of the rear end pulse is corrected by $\Delta$P3L. However, as described in the first embodiment, it is also possible to correct in accordance with: a combination of a mark to be recorded and a record code length of a space just before the mark; a combination of a mark to be recorded and a record code length of a mark that is recorded just before the mark to be recorded; a combination of a mark to be recorded and a record code length of a mark just after the mark, and the like.

The record signal 12, including a front end pulse signal 12a, a middle pulse signal 12b and a rear end pulse signal 12c, is supplied to the laser driving circuit 6. This record signal 12 operates the switch circuit 306 in the laser driving circuit 6 so as to modulate the power level.

Here, it is different from the conventional structure in that the power level setting circuits 301-303 and the drive current sources 305 are provided independently for each of the front end pulse, the middle pulse and the rear end pulse. Thus, the laser driving circuit 6 can make a power level of the front end pulse of the edge position and a power level of the rear end pulse after the edge position correction, different from a power level of the middle pulse. Note that, the laser driving circuit 6 can also make a power level of the front end pulse of the edge position and a power level of the rear end pulse after the edge position correction equal to a power level of the middle pulse.

Furthermore, this embodiment is different from the first embodiment in that the front end pulse power level correction circuit 1001 and the rear end pulse power level correction circuit 1002 are operated in accordance with the record code length. Thus, a power level of the front end pulse and a power level of the rear end pulse can be corrected for each record code length. As a result, a waveform of the recording pulse 14 as shown in FIG. 11(f) can be obtained. By this waveform, marks 402 are formed on the record track 401, as shown in FIG. 11(g).

Thus, the front end edge position and the rear end edge position of the recording mark can be corrected without correcting the edge position of the recording pulse by correcting a power level of the front end pulse and a power level of the rear end pulse in accordance with the record code length. As a result, the record signal edge correction circuit 5 can be omitted, and the recording and reproducing device can be simplified.

As described above, in this embodiment, power levels of the front end pulse and the rear end pulse are corrected in accordance with the record code length, so information can be recorded correctly with a simple device structure and without using a record signal edge correction circuit.

Note that the front end pulse, the middle pulse and the rear end pulse form a recording pulse together in this embodiment. However, the same effect can be obtained by the structure as shown in FIG. 12(a) in which a plurality of recording pulses are generated between the bias power level Pb and a power level higher than the bias power level Pb, and the middle pulse is generated as a multipulse with different numbers of pulses in accordance with the record code length.

Furthermore, it is possible to make only a power level of the front portion of the front end pulse or the rear portion of the rear end pulse in the recording pulse train different from the power level of the middle pulse, as shown in FIG. 12(b). In addition, it is possible to obtain the same effect by decreasing the power level Pc between the recording pulses to be lower than the bias power level Pb, or by providing a cooling pulse after the recording pulse train, as shown in FIG. 12(*c*), or by increasing the power level Pc between the recording pulses to be higher than the bias power level Pb, as shown in FIG. 12(*d*).

In addition, though one type of channel clock frequency (namely, one type of transfer rate) is used for recording information on a recording medium in the above first and second embodiments, it also is possible to use a plurality of different channel clock frequencies for recording on a recording medium. In this case, it is possible to change the operation of the laser driving circuit 6 in accordance with the channel clock frequency. More specifically, power levels of the front end pulse and the rear end pulse are made to be different from a power level of the middle pulse if the channel clock frequency is high, while power levels of the front end and the rear end pulses are made equal to each other if the channel clock frequency is low. This is because of the following reason. If the channel clock frequency is made to be high, it is usually necessary to decrease the resolution of correction of the edge position of the recording pulse. But in this case, it is possible to increase the resolution of correction as well as to omit the correction of the edge position by making power levels of the front end pulse and the rear end pulse different from a power level of the middle pulse. On the contrary, if the channel clock frequency is made to be low, it is not necessary to make power levels of the front end pulse and the rear end pulse different from a power level of the middle pulse. In summary, it is preferable to make power levels of the front end pulse and the rear end pulse different from a power level of the middle pulse when at the highest channel clock frequency or a plurality of high channel clock frequencies (or if it is not the lowest channel clock frequency) and to make power levels of the front end pulse and the rear end pulse equal to a power level of the middle pulse when at the lowest channel clock frequency or a plurality of low channel clock frequencies (or if it is not the highest channel clock frequency).

Furthermore, in the above first embodiment, it is possible to record values that indicate a power level of the front end pulse, a power level of the rear end pulse and an edge position of the recording pulse, as shown in Tables 1-3, in a specific area of a medium in advance.

TABLE 1

| | Power |
|---|---|
| Front end pulse power level | $P_{pL}$ |
| Rear end pulse power level | $P_{pT}$ |

TABLE 2

| Record code length | Front end edge correction amount |
|---|---|
| 3T | $\Delta_{3F}$ |
| 4T | $\Delta_{4F}$ |
| 5T | $\Delta_{5F}$ |
| 6T and above | $\Delta_{6F}$ |

TABLE 3

| Record code length | Rear end edge correction amount |
|---|---|
| 3T | $\Delta_{3L}$ |
| 4T | $\Delta_{4L}$ |
| 5T | $\Delta_{5L}$ |
| 6T and above | $\Delta_{6L}$ |

In this case, just after a medium is inserted into the drive, a power level value and an edge position value stored on the medium (and are appropriate to the medium) are read out and set as initial values for the test record. Therefore, compared with the case where the test record is performed with initial values stored in the drive, the time necessary for the test record can be shortened, and information can be recorded and reproduced more precisely.

Similarly, in the above second embodiment, it is possible to record values that indicate power level correction amounts of the front end pulse and the rear end pulse in accordance with the record code length, as shown in Tables 4 and 5, in a specific area of a medium in advance.

TABLE 4

| Record code length | Front end pulse power level correction amount |
|---|---|
| 3T | $\Delta P_{3F}$ |
| 4T | $\Delta P_{4F}$ |
| 5T | $\Delta P_{5F}$ |
| 6T and above | $\Delta P_{6F}$ |

TABLE 5

| Record code length | Rear end pulse power level correction amount |
|---|---|
| 3T | $\Delta P_{3L}$ |
| 4T | $\Delta P_{4L}$ |
| 5T | $\Delta P_{5L}$ |
| 6T and above | $\Delta P_{6L}$ | values stored on the medium (and are appropriate to the medium) are read out and set as initial values for the test record. Therefore, the time necessary for the test record can be shortened, and information can be recorded and reproduced more precisely.

Furthermore, the above-mentioned method can be applied to any type of optical disk such as a phase change material, a photomagnetic material, a pigment material, and the like, that has different optical characteristics between a recording mark and a space.

In addition, the above-mentioned modulation method, the length and position of each pulse, the kinds of the test pattern signal, and the like, are not limited to the examples in the above embodiments, but any appropriate ones can be set in accordance with a recording condition or medium.

According to the present invention, information can be recorded correctly using a simple circuit structure, so the present invention is useful particularly for an optical information recording method in which a laser beam is applied to an optical information recording medium for recording information.

What is claimed is:

1. An optical information recording method for applying a laser beam to an optical information recording medium so that optical characteristics of a photosensitive recording film are changed to form a mark or a space, recording in such a way that a length of the mark or the space corresponds to a record code length, and forming the mark with a recording pulse in which power of the laser beam is changed among a power level PpT of a front portion of the recording pulse, a power level PpL of a rear portion of the recording pulse, and a power level PpM of a middle portion of the recording pulse, wherein the method comprises:

- a record signal generation step of identifying the record code length in accordance with a modulated signal and generating a record signal to be the recording pulse,
- a record signal edge correction step of correcting an edge position of the recording pulse in accordance with the record code length for the record signal,
- a record signal power level setting step of setting each of the power levels PpT, PpL and PpM to be different from each other, and setting each of the power levels PpT, PpL and PpM higher than a bias power level Pb, and
- a laser driving step of driving a laser to emit the laser beam as the recording pulse in accordance with the corrected record signal,
- wherein the power level from a start of the front portion of the recording pulse to an end of the rear portion of the recording pulse is higher than the bias power level Pb.

2. The optical information recording method according to claim 1, wherein the record signal edge correction step includes correcting the edge position of the recording pulse in accordance with a combination of the record code length and a length of a record code just before the record code and/or a combination of the record code length and a length of a record code just after the record code.

3. The optical information recording method according to claim 1, wherein the record code is recorded on the same optical information recording medium by at least two different channel clocks, and the power levels of the recording pulse are set to be equal to each other in the record signal power level setting step if the channel clock is at least the lowest frequency.

4. An optical information recording medium on which the record code is recorded by the method according to claim 1, wherein the medium has a specific area in which information that indicates the power levels of the recording pulse as well as the edge position of the recording pulse is recorded.

5. An optical information recording device for applying a laser beam to an optical information recording medium so that optical characteristics of a photosensitive recording film are changed to form a mark or a space, recording in such a way that a length of the mark or the space corresponds to a record code length, and forming the mark with a recording pulse in which power of the laser beam is changed among a power level PpT of a front portion of the recording pulse, a power level PpL of a rear portion of the recording pulse, and a power level PpM of a middle portion of the recording pulse, wherein the device comprises:

- a record signal generation circuit for identifying the record code length in accordance with a modulated signal and generating a record signal to be the recording pulse;
- a record signal edge correction circuit for correcting an edge position of the recording pulse in accordance with the record code length for the record signal;
- a record signal power level setting circuit that can set each of the power levels PpT, PpL and PpM to be different from each other, and set each of the power levels PpT, PpL and PpM higher than a bias power level Pb; and
- a laser driving circuit for driving a laser to emit the laser beam as the recording pulse in accordance with the corrected record signal,
- wherein the power level from a start of the front portion of the recording pulse to an end of the rear portion of the recording pulse is higher than the bias power level Pb.

6. The optical information recording device according to claim 5, wherein
the record signal generation circuit generates the record signal, the record signal including a plurality of pulse signals,
the record signal edge correction circuit corrects at least a portion of the plurality of pulse signals, and
the record signal power level selling circuit includes a plurality of power level setting portions corresponding to the plurality of pulse signals, a plurality of drive current sources to which power levels are input from the power level setting portions respectively and a plurality of switch circuits for turning on and off current from the plurality of drive current sources in accordance with the plurality of corrected pulse signals.

7. The optical information recording device according to claim 5, wherein the record signal edge correction circuit corrects the edge position of the recording pulse in accordance with a combination of the record code length and a length of a record code just before the record code and/or a combination of the record code length and a length of a record code just after the record code.

* * * * *